US012337399B2

(12) United States Patent
Robertson et al.

(10) Patent No.: US 12,337,399 B2
(45) Date of Patent: Jun. 24, 2025

(54) SYSTEMS AND METHODS FOR EXTRACTING KEY CODE DATA AND CONFIGURING VEHICLE KEYS

(71) Applicant: iKeyless, LLC, Louisville, KY (US)

(72) Inventors: Douglas Robertson, Crestwood, KY (US); Adam Pizer, Louisville, KY (US); Jon Determann, Louisville, KY (US); Florian Luaire, Louisville, KY (US); Pradnya Deokar, Louisville, KY (US)

(73) Assignee: iKeyless, LLC, Louisville, KY (US)

( * ) Notice: Subject to any disclaimer, the term of this patent is extended or adjusted under 35 U.S.C. 154(b) by 744 days.

(21) Appl. No.: 17/447,691

(22) Filed: Sep. 14, 2021

(65) Prior Publication Data

US 2022/0134450 A1    May 5, 2022

Related U.S. Application Data

(63) Continuation-in-part of application No. 17/169,287, filed on Feb. 5, 2021.

(Continued)

(51) Int. Cl.
B23C 3/35      (2006.01)
G06T 7/246     (2017.01)
(Continued)

(52) U.S. Cl.
CPC ............... B23C 3/35 (2013.01); G06T 7/246 (2017.01); G07C 9/00309 (2013.01); G06T 7/50 (2017.01); G06T 2207/20076 (2013.01)

(58) Field of Classification Search
None
See application file for complete search history.

(56) References Cited

U.S. PATENT DOCUMENTS 2,582,012 A    1/1952   Currier
3,323,420 A    6/1967   Roxburgh
(Continued)

FOREIGN PATENT DOCUMENTS

EP    0 492 372 A2    7/1992
EP    3 412 389 A1    12/2018
(Continued)

Primary Examiner — Leon Viet Q Nguyen
(74) Attorney, Agent, or Firm — Gray Ice Higdon

(57) ABSTRACT

A system and method to automatically extract bitting information, such as keycode information, for replicating original/master key. System comprises an imaging device that scans the key blade of the original key and sends images to the server where the keycode gets extracted using an iterative software algorithm based on maximum likelihood principle. In one example a system comprises a kiosk which includes SBC (Single Board Computer), imaging device, touch screen and transponder identification module determines compatible SKU (from internal SKU database) if needed, and a compatible key with a matched cut key blade gets delivered to the location of Kiosk to get paired to the car. Another type system comprises a Smartphone/tablet with CKE application instead of KIOSK to scan the original keyblade. The application sends images to a central server for decoding and cutting a duplicate key, and a compatible duplicate key with matched cut key blade is delivered to the associated customer.

29 Claims, 20 Drawing Sheets

Related U.S. Application Data

(60) Provisional application No. 62/970,419, filed on Feb. 5, 2020.

(51) Int. Cl.
  *G07C 9/00* (2020.01)
  *G06T 7/50* (2017.01)

(56) References Cited

U.S. PATENT DOCUMENTS

| | | | |
|---|---|---|---|
| 3,413,892 | A | 12/1968 | Casey |
| 3,442,174 | A | 5/1969 | Weiner et al. |
| 3,796,130 | A | 3/1974 | Gartner |
| 4,899,391 | A | 2/1990 | Cimino et al. |
| 5,127,532 | A | 7/1992 | Cimino et al. |
| 5,807,042 | A | 9/1998 | Almblad et al. |
| 6,065,911 | A | 5/2000 | Almblad |
| 6,152,662 | A | 11/2000 | Titus et al. |
| 6,175,638 | B1 | 1/2001 | Yanovsky |
| 6,185,311 | B1 | 2/2001 | Yanovsky et al. |
| 6,406,227 | B1 | 6/2002 | Titus et al. |
| 6,449,381 | B1 | 9/2002 | Yanovsky et al. |
| 6,543,972 | B1 | 4/2003 | Cimino |
| 6,588,995 | B2 | 7/2003 | Wills et al. |
| 6,647,308 | B1 | 11/2003 | Prejean |
| 6,836,553 | B2 | 12/2004 | Campbell et al. |
| 6,839,451 | B2 | 1/2005 | Campbell et al. |
| 6,895,100 | B1 | 5/2005 | Pacenzia et al. |
| 7,890,878 | B2 | 2/2011 | Bass et al. |
| 7,891,919 | B2 | 2/2011 | Bass et al. |
| 8,128,322 | B2 | 3/2012 | Bass et al. |
| 8,287,215 | B2 | 10/2012 | Freeman et al. |
| 8,532,809 | B2 | 9/2013 | Freeman |
| 8,626,331 | B2 | 1/2014 | Marsh et al. |
| 8,634,655 | B2 | 1/2014 | Thompson et al. |
| 8,634,951 | B2 | 1/2014 | Freeman |
| 8,644,619 | B2 | 2/2014 | Thompson et al. |
| 8,682,468 | B2 | 3/2014 | Marsh et al. |
| 8,965,794 | B2 | 2/2015 | Bass et al. |
| 8,979,446 | B2 | 3/2015 | Freeman |
| 8,985,918 | B2 | 3/2015 | Bass et al. |
| 8,992,145 | B1 | 3/2015 | Mueller et al. |
| 9,101,990 | B2 | 8/2015 | Mutch et al. |
| 9,199,318 | B2 | 12/2015 | Freeman et al. |
| 9,269,136 | B2 | 2/2016 | Day et al. |
| 9,308,590 | B2 | 4/2016 | Bass et al. |
| 9,323,237 | B2 | 4/2016 | Freeman |
| 9,323,884 | B2 | 4/2016 | Overman et al. |
| 9,468,982 | B1 | 10/2016 | Mueller et al. |
| 9,514,385 | B2 | 12/2016 | Thompson et al. |
| 9,556,649 | B1 | 1/2017 | Mueller et al. |
| 9,558,236 | B1 | 1/2017 | Hagen et al. |
| 9,563,885 | B2 | 2/2017 | Marsh et al. |
| 9,582,734 | B2 | 2/2017 | Thompson et al. |
| 9,656,332 | B2 | 5/2017 | Bass et al. |
| 9,682,432 | B2 | 6/2017 | Mutch et al. |
| 9,687,920 | B2 | 6/2017 | Bass et al. |
| 9,808,900 | B2 | 11/2017 | Gardner et al. |
| 9,815,126 | B2 | 11/2017 | Bass et al. |
| 9,818,041 | B2 | 11/2017 | Mutch et al. |
| 9,914,179 | B2 | 3/2018 | Freeman et al. |
| 9,925,601 | B2 | 3/2018 | Mutch et al. |
| 9,934,448 | B2 | 4/2018 | Thompson et al. |
| 9,950,375 | B2 | 4/2018 | Burkett et al. |
| 9,963,908 | B2 | 5/2018 | Bass et al. |
| 9,987,715 | B2 | 6/2018 | Gardner et al. |
| 10,010,949 | B2 | 7/2018 | Hagen et al. |
| 10,013,833 | B2 | 7/2018 | Blalock et al. |
| 10,018,982 | B2 | 7/2018 | Chambers et al. |
| 10,068,401 | B1 | 9/2018 | Blalock et al. |
| 10,252,392 | B2 | 4/2019 | Gardner et al. |
| 10,421,133 | B2 | 9/2019 | Bass et al. |
| 10,480,214 | B2 | 11/2019 | Bass et al. |
| 10,482,439 | B2 | 11/2019 | Freeman |
| 10,503,384 | B2 | 12/2019 | Bass |
| 2009/0228795 | A1 | 9/2009 | Bass |
| 2010/0278438 | A1* | 11/2010 | Thompson ............ G06F 18/22 382/209 |
| 2011/0297691 | A1 | 12/2011 | Freeman |
| 2011/0301738 | A1 | 12/2011 | Freeman |
| 2012/0243957 | A1 | 9/2012 | Drake et al. |
| 2013/0138243 | A1 | 5/2013 | Freeman |
| 2013/0170693 | A1 | 7/2013 | Marsh |
| 2014/0229317 | A1* | 8/2014 | Fagan ................ G06Q 30/0621 705/26.5 |
| 2014/0314508 | A1* | 10/2014 | Seriff ................... G06V 10/424 409/81 |
| 2014/0377027 | A1 | 12/2014 | Burkett et al. |
| 2015/0050094 | A1 | 2/2015 | Gerlings |
| 2015/0178721 | A1* | 6/2015 | Pandiarajan ..... G06K 19/06112 705/64 |
| 2015/0199801 | A1* | 7/2015 | Day ......................... G06T 7/74 382/152 |
| 2016/0114412 | A1 | 4/2016 | Bosch |
| 2016/0321632 | A1 | 11/2016 | Moore et al. |
| 2016/0375503 | A1 | 12/2016 | Bass et al. |
| 2017/0039447 | A1 | 2/2017 | Mutch et al. |
| 2017/0193327 | A1 | 7/2017 | Thompson et al. |
| 2017/0225242 | A1 | 8/2017 | Spangler |
| 2018/0046881 | A1 | 2/2018 | Mutch et al. |
| 2018/0065226 | A1 | 3/2018 | Gardner et al. |
| 2018/0079014 | A1 | 3/2018 | Marsh |
| 2018/0079015 | A1 | 3/2018 | Marsh et al. |
| 2018/0154459 | A1 | 6/2018 | Freeman |
| 2018/0204089 | A1 | 7/2018 | Thompson et al. |
| 2018/0207733 | A1 | 7/2018 | Mutch et al. |
| 2018/0232983 | A1 | 8/2018 | Blalock et al. |
| 2018/0250785 | A1 | 9/2018 | Gardner et al. |
| 2018/0264561 | A1 | 9/2018 | Schmidt |
| 2019/0287332 | A1* | 9/2019 | Mutch ................ G07C 9/00857 |
| 2020/0265388 | A1* | 8/2020 | Marcelle ............ G07F 17/0014 |

FOREIGN PATENT DOCUMENTS

| | | |
|---|---|---|
| EP | 3 412 405 A1 | 12/2018 |
| EP | 3 412 406 A1 | 12/2018 |
| EP | 3 466 577 A1 | 4/2019 |
| GB | 952978 A | 3/1964 |
| GB | 2 293 341 A | 3/1996 |
| GB | 2563224 A | 12/2018 |
| GB | 2564556 A | 1/2019 |
| GB | 2564557 A | 1/2019 |
| GB | 2567194 A | 4/2019 |
| WO | WO 99/55482 A1 | 11/1999 |
| WO | WO 2008/066857 A2 | 6/2008 |
| WO | WO 2011/153473 A2 | 12/2011 |
| WO | WO 2012/170321 A2 | 12/2012 |
| WO | WO 2012/103774 A1 | 7/2013 |

\* cited by examiner

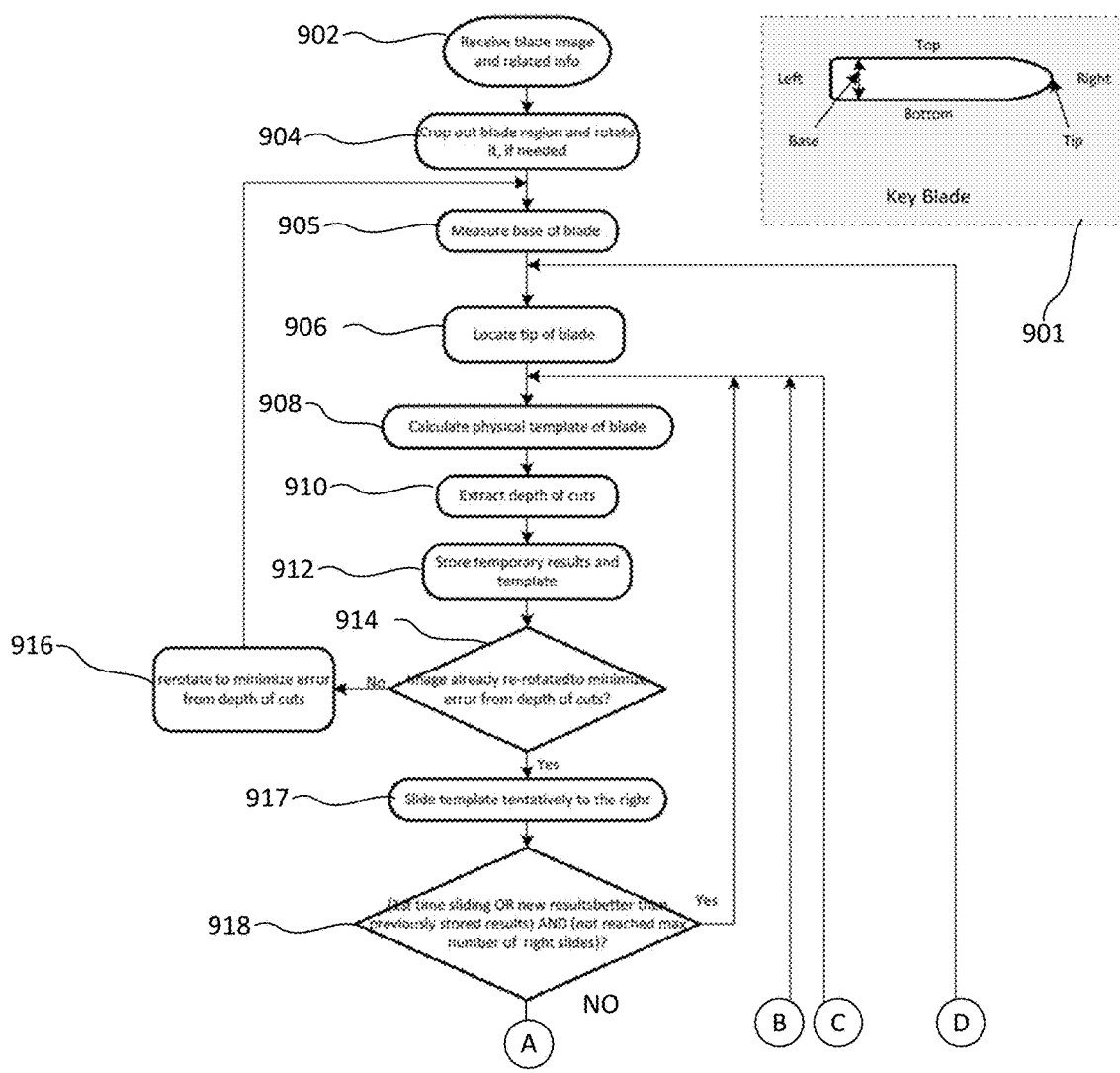
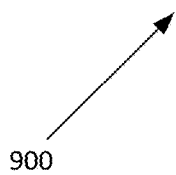
FIG.9A

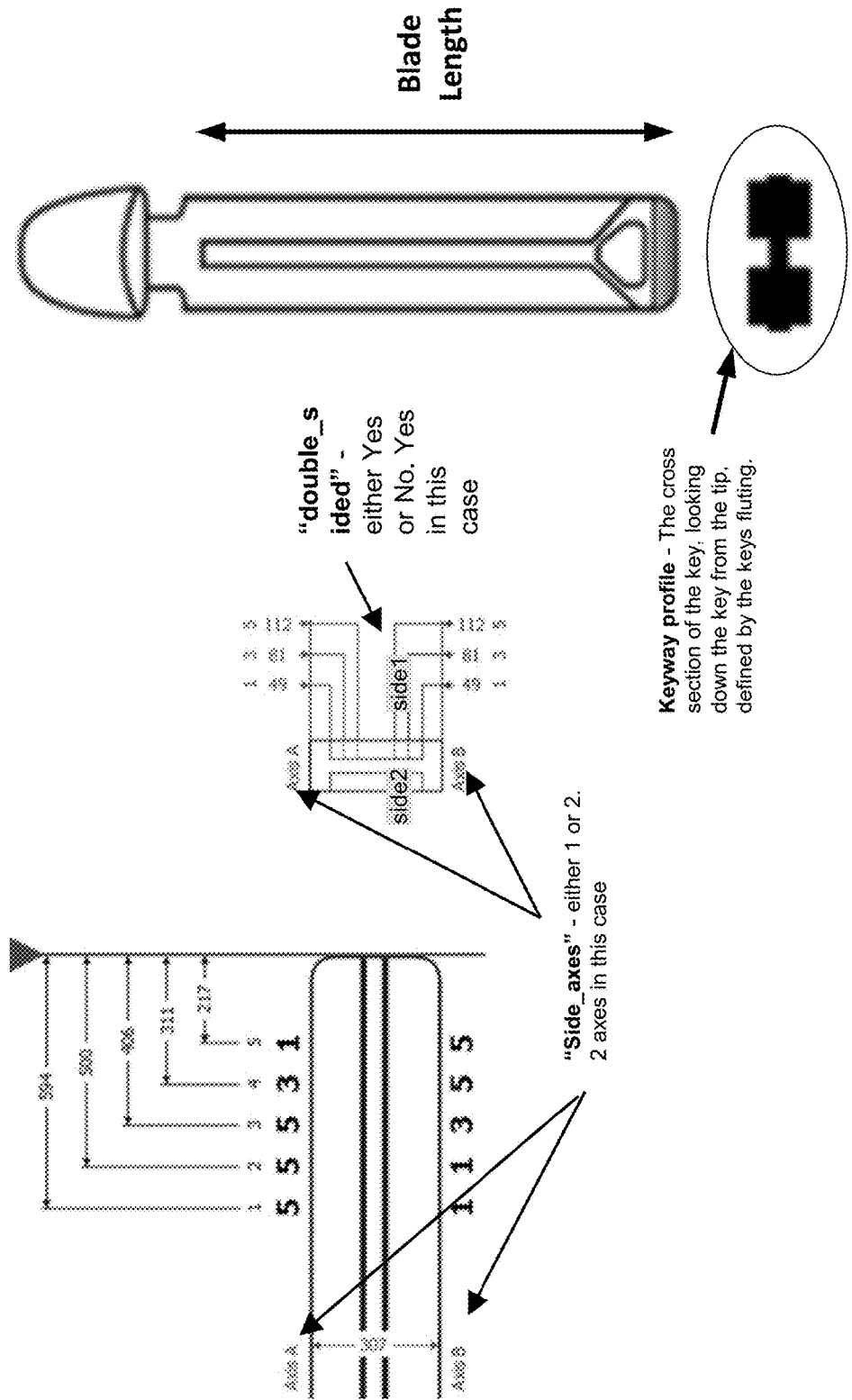

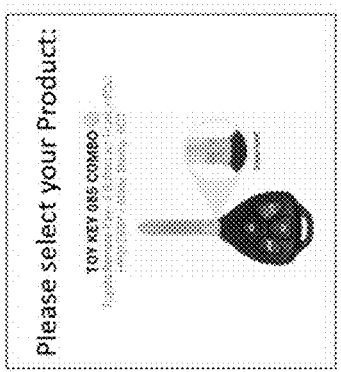
FIG. 14
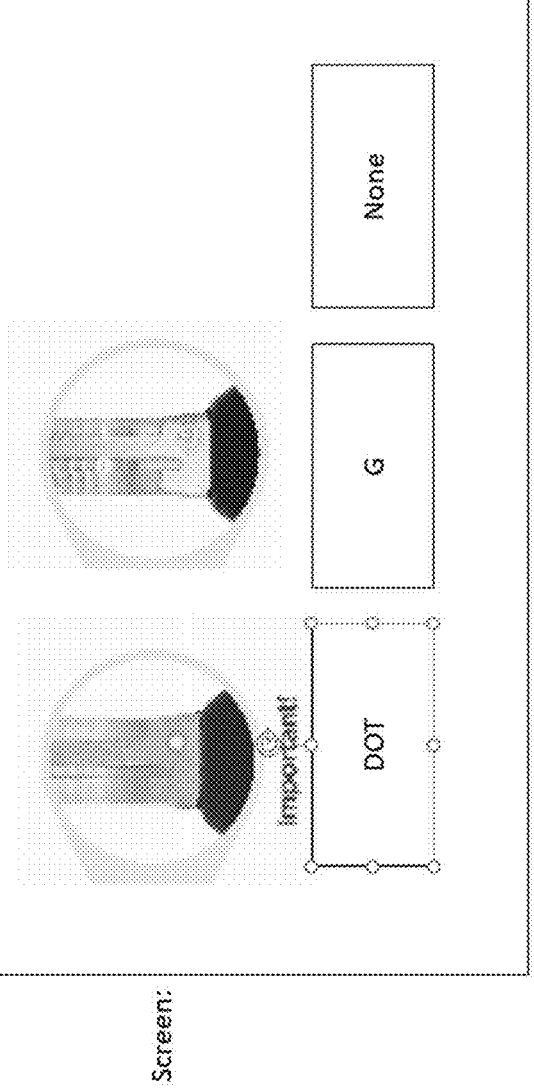
FIG. 13
FIG. 15

Screen (if DOT):
Please select your Product:
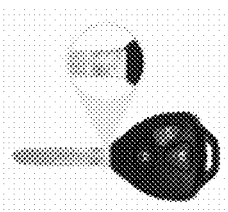
TOY KEY OBS 25 COMBO
Screen (if G):
Please select your Product:
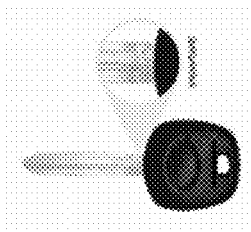
TOY KEY 800
Screen (if None):
Does your key list a 'FCC ID' on the back? If yes, please select it. If no, please select None
| HYQ12BBY | None |
Please select your Product:
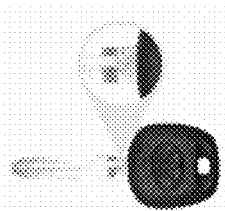
TOY KEY 801
Please select your Product:
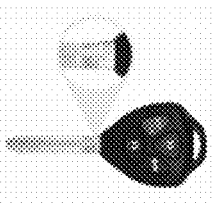
TOY KEY OBS 25 COMBO
FIG.16

Screen: Do you start your vehicle by pushing a button on your dash?

YES

NO

IF YES:
Screen:
Does your key list a 'FCC ID' on the back? If yes, please select it. If no, please select None.
HYQ14AAB
None
Screen:
Please select your Product:
TOY 130 SMARTKEY
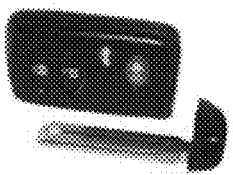
Screen:
Please select your Product:
TOY KEY SSD
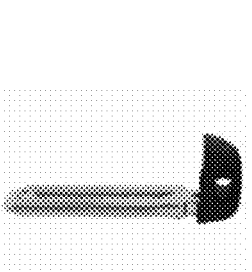
FIG.18

If NO:
Is there a letter stamped on your key blade? Please select it below. If not, please select None.
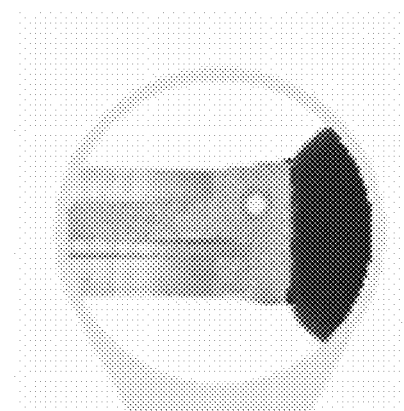
Important!
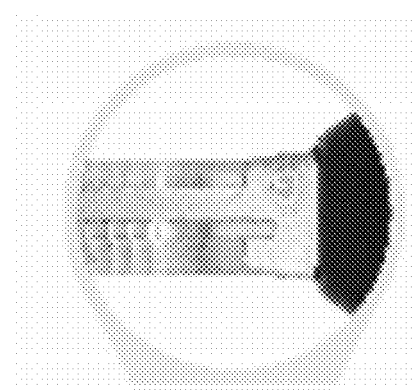
Screen:
| DOT | G | None |
FIG.19

SYSTEMS AND METHODS FOR EXTRACTING KEY CODE DATA AND CONFIGURING VEHICLE KEYS

CROSS-REFERENCE TO RELATED APPLICATION

The present invention claims the benefit of priority to U.S. patent application Ser. No. 17/169,287 filed Feb. 5, 2021 (113083.018US1), entitled SYSTEMS AND METHODS FOR CREATING REPLACEMENT KEYS (Robertson et al.), and to U.S. Prov. Pat. App. No. 62/970,419 filed Feb. 5, 2020 (113083.018PRV), entitled SYSTEMS AND METHODS FOR CREATING REPLACEMENT KEYS (Robertson et al.), both of which are incorporated by reference herein in its entirety.

FIELD OF INVENTION

The present invention generally relates to the field of systems and methods for replicating transponder/non-transponder keys. More specifically, the present invention relates to methods used for capturing, processing, and extracting a keycode from images of a master key (transponder and non-transponder keys) for replication purposes.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

Contemporary remote keyless entry systems are designed to be easy to use and secure from attackers. When a user presses a button on his or her keyless remote, an internal microprocessor interprets the request and generates a unique packet of binary data. This packet may contain a unique serial number of the remote, an authentication string, function code, and various checksums. This data packet is then transmitted by the remote via an ultra high frequency radio signal to the vehicle. The user's vehicle can then process the data verifying the remote is authorized and perform the requested action (ex: unlocking a door).

The transmitted radio signal could be monitored by possible attackers so the authentication string is important in maintaining the security of the vehicle. The authentication string often changes with each button press in what is known as a "rolling code". This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Additionally, starting in the early 1990s, car keys began incorporating transponder technology. Transponders are small plastic or glass inserts that are self-contained devices which supplemented the security of the cut key blade. Transponders require no battery and are powered by a low frequency radio signal delivered from a loop of wire around the ignition coil. When a driver starts his or her car, the key blade activates the ignition and the car simultaneously "reads" the transponder via the wire loop to verify the key was authorized to start the car. If the transponder does not "respond" with a valid code (e.g., in the case of hot-wiring a car), the car will shut itself off after a few seconds from starting.

Security transponder evolution has mirrored that of remote keyless entry systems with the first generation being simple, insecure devices that transmitted a fixed value when interrogated by the ignition coil. Much like remote keyless entry, the communication signals can be easily monitored by an attacker with legally available tools. To avoid replay attacks, transponders quickly moved to more complex encryption, such as HITAG and AES, as well as the use of rolling codes. Transponders are now typically highly secure devices capable of bidirectional communication with the vehicle. With the ability for the car to send data to a transponder, some vehicle keys have the ability to store hundreds of bytes of information about the key and vehicle. This information may comprise secret encryption keys and comfort features such as the last radio station used or electronic seat position.

In addition to incorporating transponders with the key blade, remote keyless entry ("RKE") systems and key fobs now incorporate the transponder functionality with remote keyless entry microprocessors on the key blade. The combination of transponder, remote keyless entry microprocessor and system, and key blade forms a combination key where the keyless remote, key blade, and security transponder are packed together into a single device. These devices are both cheaper to produce than keys and remotes and are more secure. The remote keyless entry portion and transponder portion of the key can share information providing for the transponder to receive rolling code and encryption key updates from the vehicle. Using a combination key with the transponder and remote keyless entry system in communication with one another, the rolling code protocols and encryption techniques may become very advanced and unbreakable to all but the most dedicated attacker.

Due to this high margin of security, these devices are not something the lay person could replace or add to their vehicle easily. To pair such a "combo" key to a car requires both a locksmith to cut the blade and specialized programming tools, unavailable to the public, to pair the transponder and remote with the vehicle. Often the vehicle dealer is the only source for keys and pairing tools which leads to high prices for replacement keys/remotes.

Given the complexity of the RKE systems in vehicles, automotive key/remote duplication is a complex and expensive process. Car owners may have a difficult time finding replacement keys and remotes, especially for older vehicles that may no longer be supported by the original manufacturer or automotive dealership.

Once a vehicle owner has located a source for a new RKE device, they must purchase the device and then pay for a locksmith to "pair" the product to the vehicle. This "pairing" process usually involves the use of an expensive dealer owned programming tool or an aftermarket programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key or remote with the vehicle. Once generated, these authentication codes are static. If the authentication codes were captured during the pairing process, they would remain valid for later usage. Generally, this conversation between the tool and the vehicle includes a security transponder, the vehicle electronic control unit ("ECU") or body control module ("BCM"), and the RKE device. If this process is not executed properly or a programming fault occurs it is possible to leave the car in a "bricked" state where the vehicle will not start or respond properly to the RKE device. It can be a very expensive process to reset the ECU or body control module of a vehicle.

The problem described above can become even more complicated if the vehicle owner loses their RKE device while traveling to locations where they do not have access to a dealership that can support their vehicle. In this instance, the vehicle owner may be faced with significant towing charges and delays while they wait to have their vehicle key replaced by an authorized dealer. These are only the basic challenges associated with replacing keys and remotes. The key generation and replacement problem is even more complex when viewed from a locksmith perspective.

A wide range of tools and software is required to pair an RKE device to a vehicle. A typical suite of tools may include a very expensive programming tool, software modules to cover various vehicle brands and model years, and a separate OBD port module that performs all or part of the pairing process. Tooling and software costs alone can easily exceed $20,000 if the locksmith wants to service a broad range of vehicles.

In addition to the programming tools and software, locksmiths must provide key blades that come in many types and shapes depending on the manufacturer's requirements for the ignition cylinder. Modern blades are typically milled as opposed to traditional grinding wheel approaches. These special cutting tools are also very expensive.

Once the blade issues are addressed, the locksmith may also be required to purchase PIN codes and wait long periods of time to activate the PIN codes during the pairing process. To recover labor and equipment costs locksmiths typically charge their customers significant fees for their services.

From a customer perspective, other issues may occur that may cause the pairing process to become even more complex. In many cases, when performing the pairing process, the customer must have all their keys and remotes available for the locksmith at the time a key is to be paired to the vehicle. The maximum number of keys that can be paired varies between vehicle makes and models but is normally between 4-6 keys. Some vehicles have "master" and "valet" keys. Valet keys cannot normally be used when pairing new keys to the vehicle so, if the master keys have been lost, a new master key must be first be made. Additionally, some customers may need to have their keys or remotes paired to the vehicle again after a vehicle service or repair if the battery was removed from the vehicle for an extended period.

These issues compound to make for a very challenging and negative experience for the customer when replacing or copying an OEM vehicle key. Customers are forced to source replacement keys from dealers or locksmiths.

One possible solution to some of these issues is the use of a "virtual key" hosted entirely on a smartphone. Many virtual key devices bypass traditional immobilizers and security systems. Some even communicate directly with the BCM or ECU. These approaches may be dependent on networks that lack appropriate levels of security thereby putting the vehicle at risk. Additionally, car companies are constantly designing new systems that are unique to their vehicles and do not rely on traditional RKE solutions. In these cases, the customer is forced to purchase expensive replacement keys/remotes directly from the OEM supplier or dealerships. Smart phone related solutions also rely on phone apps and hardware that may have failure modes due to limited network access at critical times. Battery limitations may also be an issue for smart-phone hosted virtual keys. It can be difficult to make the purchasing and pairing of any key, RKE solution, or transponder keyfob, especially a bladed cut key, simple and affordable for a user or consumer.

What is needed is a system and method for a user to remotely order a copy or replacement of a master key. What is needed is a service that enables a user to order a replacement copy of a master key without the burden of locating a replacement product, locating a suitable locksmith, and scheduling a time to have the product paired with the vehicle.

SUMMARY OF THE INVENTION

The present invention provides a system and method for duplicating house and vehicle keys. The system of the present invention comprises a key duplication device which includes a touch screen display that provides a user interface and advertising display. The touch screen display of the key duplication device further provides an interface that accepts as input from a user known vehicle make model and year selections. The key duplication device further comprises an integrated transponder reader that determines transponder type and based at least in part on that determination offers compatible key blanks for user selection. The key duplication device further comprises a camera or imaging device configured to capture an image of the key, the key being positioned in a holder in the key duplication device and illuminated by a set of one or more illumination sources. The key duplication device further comprises a communications interface configured to send the image(s) captured of the key by the camera, key information, vehicle information, of the key and any other information input by the user to a server in a second or remote location for processing.

The server at the remote location comprises a processor or module that, when executing code stored in a memory, determines key bitting (geometry, key code, bitting, etc.). The server may further comprise or may be in communication with a database that is referenced to aid the processor in translating key characteristics into a master key code. The server may further comprise or be in communication with a processor or module that calculates a confidence value that the key was decoded correctly and can flag an operator to review the output manually. The server may further comprise or be in communication with a search tool to assist the algorithm or operator in determining the master key code based at least in part on manually observed characteristics and based at least in part on a database of all possible valid key bitting permutations. The server may further comprise or be in communication with a remote communication device, such as a modem or network card, that receives key code, picture of customer key (not blade), customer vehicle and order information at a hub facility with an operator that may, in some circumstances, validate that the ordered key is compatible with the customer vehicle.

The claimed system and method may further comprise a key creation machine used by the operator to create a key based at least in part on the key code and customer selected blank data. The claimed method may further comprise a delivery service that will bring the cut key to the first location, the first location being the location at which the customer ordered the key, or to another location. The claimed system and method may further comprise a transponder cloning device at the first location or other location that can optionally read the transponder information from the master key and write the information read from the master key into the newly created key which may be the cut key. Alternatively, if cloning is not possible or not desired, the claimed system and method may comprise a programming device configured to provide the delivery driver with the functionality to pair the new key to the vehicle.

The present invention further provides systems and methods for reproducing vehicle OEM keys from stored data relating to an original vehicle OEM key. The present invention provides for key cutting by photo, which enables users to capture images of their keys at a remote location, e.g., a retail location by a compact box or kiosk system, and have keys cut and then shipped to the user. The system and method of the present invention eliminates the need of retailers or other businesses to buy unnecessary and expensive key cutting equipment, carry inventory, and provide extensive employee training for key duplication. One such system and method provides a "key-by-mail" system and is disclosed in U.S. patent application Ser. No. 16/898,251, entitled SYSTEMS AND METHODS FOR CREATING REPLACEMENT VEHICLE KEYS, Determan et al., filed Jun. 10, 2020 (113083.014US1), which is incorporated by reference herein in its entirety.

Replacement or duplicate keys and related information may be stored in a "key bank" such as described in U.S. patent application Ser. No. 16/153,602, filed Oct. 5, 2018 (113083.009US1), and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which is incorporated herein by reference in its entirety. An additional "kiosk and remote processing" system for providing key duplication processing information related to master keys for duplicating is described in U.S. Provisional Patent App. 62/970,419, entitled SYSTEMS AND METHODS FOR CREATING REPLACEMENT VEHICLE KEYS, Determan et al., filed Feb. 5, 2020 (113083.018PRV), which is incorporated by reference herein in its entirety.

The system of the present invention may be one element or component of an affordable system for the ordering and pairing of replacement keys by a user. The claimed invention provides for the ordering of replacement keys by a user from an application, website, webstore, kiosk, or physical store. The present invention also provides an inexpensive and simplified method for pairing a replacement key with a vehicle, such as by a pairing dongle. The present invention also provides for the cutting of a keyblade on a replacement key without requiring a locksmith to perform an expensive and complicated replacement cutting at the consumer's location. The cutting of a replacement keyblade from a set of stored information reduces the risk of a miscut or incompatible key and reduces the inconvenience for the user in ordering a replacement key.

In one embodiment, a user inputs vehicle make-model-year ("MMY") or Vehicle Identification Number ("VIN") information on a touchscreen device and inserts a master key of which a copy is to be made into a holder which positions the key into a photo chamber. The system aligns the key relative to the camera and then captures one or more images in order for an image processing algorithm to identify and store all of the key bitting information that is required to make a copy of the key. Alternatively, the user may use a handheld image capture device and capture one or more photos of the master key which are then processed by an image processing algorithm to identify and store the key bitting information. This may be the preferred method of capturing and processing an image of the key to determine and store bitting information. The system may also prompt the user to adjust the position of the key, adjust the position of the camera, modify the captured image, or make other changes required to obtain an image of the master key that is suitable for further processing. The determination of the bitting information may be done on the device at a retail location, on the handheld device, or it may be done after the images have been uploaded to a server.

After a set of images of the master key to be copied have been captured by the system using either of the embodiments described above, the captured images are sent electronically over a computer network to a central processing server where the images are validated and processed, which can include determination of key bitting information. A new key will be cut and shipped out to the user's location or dispatched to a retail location for pickup upon request by the user or after the image of the master key has been received and processed depending on the order or request type.

For some vehicle master keys, additional information may be captured at the same time the images of the master key are captured. For example, for some keys transponder and rolling code information may be captured by the system such that a copy or clone of the original master key may be produced along with the cut key blade. When that information is not captured with the images of the master key, the user will be sent a programming device with instructions on pairing the newly cut key copy to the user's vehicle.

The system and method of the present invention is able to cut a copy of a master key based on a set of images of the master key with a high degree of success. The system and method of the claimed invention is also able to accurately read, transfer, and remotely program key transponder information and other information such as rolling code information for a newly cut key copy. By capturing images of a master key using a handheld image capture device or by using a kiosk at a remote location, the system and method of the claimed invention is able to deliver by mail a replacement cut key copy to a user within 48 hours of a request being received. An order for the cut key copy may be processed and fulfilled within 2 business hours using the system and method of the claimed invention. If dispatched to a retail location for pickup, a replacement cut key copy may be delivered to a user within 2 business hours.

The present invention creates copies from images of master keys for both edge cut and high security key types. The process of cutting a key blade copy or duplicate based on the images of the master key may either be a manual or automatic process, such as by a completely automatic key cutting machine.

Images of the master key may either be a single image, a best image selected from a set of images, or a composite image stitched together and comprised of a set of images forming an ideal target image. A video may also be used to form a complete composite image of a master key. Additionally, other information such as vehicle MMY, vehicle body type, and vehicle identification number ("VIN") information may be captured along with the image or images of the master key to be used to cut a key blade copy.

Processing of the image or images of the master key to be copied comprises the first step of detecting the outline of the key in a 2-D space, broken up into best-fit line segments, then evaluating those segments according to a set of known key blank physical properties and applicable tolerances in order to auto-correct (de-skew, stretch/compress), auto-rotate, auto-align, and auto-scale the key image to either the tip or shoulder. The properties considered in this evaluation may include security type (edge-cut or high security), double or single sided, parallel and orthogonal surface locations, blade width, blade tip to shoulder distance, blade tip to first bit distance, blade shoulder to first bit distance, flat widths, cut angles, alignment surfaces (i.e., tip or shoulder), keyway profile, and MMY (in consideration of key wear likelihood and tendency). The second step of determining the grid extents is performed: Parallel lines, one for the top and one for the bottom, are assigned; next, at a right angle to the top and bottom lines, the tip and shoulder (if applicable to the key blank) lines are assigned. The third step consists of overlaying a "grid" of the key blank's known depth and spacing data (DSD) onto the key image, where edge detection is then used to assign a bit position and bit number, along with a confidence value. The confidence value may be a function of one or more of the following: known tolerances; thicknesses of detected shadows at each suspected bit position location; degree of agreement between opposite sides (in the case of a 2-sided symmetrical keyway); blade profile differences that can contribute to predictable differences in light and shadow thicknesses; bit error at each bit position using the absolute value of the error between the measured cut depth and the depth assigned to the detected bit value; and the sum of this same error across all bits. Next, at each bit position, the bit number with the highest confidence value is output. This is the First Pass Bitting Output. The fourth step enables a pseudo closed-loop bitting determination/validation algorithm, which is iterative in nature and is critical in the evaluation and adjustment of the bitting output of each "pass" to ultimately arrive at the final bitting output with the highest confidence value. This algorithm consists of referencing known validation data against each "pass" of the algorithm and updating the confidence value at each bit position. For greater quality control, when the final bitting output is determined, to help minimize incorrect key bitting determination and unhappy customers, if the confidence value is below a predetermined threshold, an expert operator at iKeyless is flagged to manually check and/or adjust the deciphered key characteristics.

The primary validation data used is simply the lookup table of all valid bitting permutations, or "key codes" for the known key series. After each pass of the algorithm, a confidence value is calculated based on the bit error at each bit position between the absolute value of the difference between the measured cut depth at that bit position and the cut depth associated to the bit value at that same position of the potential matching key code. It should be noted that for any pass of the algorithm, a falsely deciphered key code match is inherently unlikely as the number of key codes in any particular key series is a small subset of all possible permutations that can be generated from the full space of bitting. For example, key series "40000-49999" used on Toyota 5-cut high security keys has 10,000 key codes, out of 59,049 (10 bit positions, 3 depths) possible permutations. So, in this example, the probability of wrongly deciphering a series of key cuts as any key code is about 17%. The probability of a false match is further decreased by applying the previously described predetermined confidence value limit to every potential match and selecting the potential match with the highest confidence value.

To aid the automatic algorithm and/or operator in reducing the number of passes of the algorithm (i.e., reducing the number of possible matching key codes), a key code/bitting search algorithm has been developed that allows the search criteria to be one or more of the following. The maximum bit value allowed at the first bit position, the minimum and maximum bits values, the number of bits, the maximum adjacent bit variation (MACS), the minimum number of different bit values, the minimum difference between the highest bit value and lowest bit value, the maximum number of repeated adjacent bit values, the maximum number of times any bit value may appear, the likelihood that any two or more bit positions are the same bit values, and the possible range of values at any particular bit position. Again given the low probability of a false match to a valid key code within a known key series and again using the key series "40000-49999" as an example, the key code/bitting search algorithm can reduce the list of potential matches from 10,000 to 3 with only a few of the search criteria being applied. At that point, the match with the highest calculated confidence value is selected.

When manual checking and adjustment occurs, over time, the algorithm may log its iterative failures and final successes to allow for experts to adjust the automatic algorithms, helping to increase the final pass bitting output accuracy.

Alternatively, or in addition, processing of the image or images of the master key to be copied comprises evaluating the image according to key bitting rules and determining if the key bittings determined from the image or images is within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A set of target key features are determined from this best possible outline to be used to create the key blade copy. The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a key blade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

When an order for a new key blade copy is placed, a shipping order is created based on stored or entered user information and then a set of shipping labels are generated to be used for shipping the key blade copy to the user. The user's address and vehicle ownership may be validated by the system prior to generating the shipping order information and the shipping labels.

In one exemplary process a user may have a handheld computing device, such as a laptop, tablet, cell phone, or smartphone with image capture capability, with an application installed thereon. When launched, the application provides for a process to begin for the user to capture images of a master key to be used for a key blade copy order. The user may be shown a video or a series of images as instructions for the image capture and order processes.

The user selects or inputs vehicle MMY and the system and application continually updates subsequent selections and options based on the previous selections. The user also inputs name, email address, VIN, shipping address and confirms this information. The email address and shipping address may also be validated. The application then launches an image capture mode and will auto-focus to get the master key in focus, then the user presses a button or interacts with a user interface element in the application to capture an image of the master key with the handheld computing device. The captured image is analyzed in real-time to ensure the image is of the quality needed for further processing and provides input back to the user. The application may notify the user that the picture of sufficient quality or may inform the user that they need to recapture the image.

Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

Once a validated image is complete, the user is notified that they will receive a key programming dongle programmer that will allow them to pair the newly cut key blade copy, which may comprise other components such as a programmable key fob or transponder, to their car themselves. This saves the time and money, and the total price of the key copy includes the price of the programmer included. The programmer includes instructions for pairing the new key copy to the user's vehicle when it is shipped.

The user may be prompted for additional information, such as payment information, to complete an order. This process may be completed entirely on a handheld computing device or may be performed by a stand-alone kiosk, by a combination of a handheld computing device and a stand-alone kiosk, or by a retailer's point-of-sale ("POS") system. After an order has been confirmed the user may be provided with confirmation such as by receiving an email with the order information therein. The email or order confirmation may also comprise a receipt, an estimated shipping date, and contact and support information—such as a sales and support website where a user may view their order and purchase information. After an order has been completed the application resets to an initial state to allow the user to order another key or to allow a different user to order a key.

The replacement key of the present invention works without requiring a "pairing" process. A pairing process for a vehicle key is a multi-step process that typically involves the user performing multiple operations with either the key or vehicle or both that may include opening/closing doors, opening/closing windows, pressing buttons on the vehicle key, operating controls in the vehicle, starting and turning off the vehicle, and also includes authenticating the vehicle key with the vehicle by synchronizing encryption information which may include the entry of a unique PIN. Additionally, pairing requires the use of specialized tools that must be connected to either the key, the vehicle, or both and that may only be used by authorized vehicle dealers or locksmiths.

Replacement keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014, also published as U.S. 2014/0218165, Johnson et al., which is incorporated by reference herein in its entirety. Methods and systems for dongle-based key pairing and programming are described in U.S. Provisional Patent Application No. 62/690,326, entitled SYSTEM AND METHOD FOR PAIRING A KEY WITH A VEHICLE VIA A VEHICLE COMMUNICATIONS PORT BY A DONGLE, Johnson et al., filed Jun. 26, 2018, and in U.S. Provisional Patent Application No. 62/703,669, entitled SYSTEM AND METHOD FOR PAIRING A KEY WITH A VEHICLE VIA A VEHICLE COMMUNICATIONS PORT BY A DONGLE, Johnson et al., filed Jul. 26, 2018, both of which are incorporated herein by reference in their entirety. Replacement keys and related information may be stored in a "key bank" such as described in U.S. Provisional Pat. Application Ser. No. 62/695,620, filed Jul. 9, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), and in U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), both of which are incorporated herein by reference in their entirety.

The system and method of the present invention provide for a significant reduction in capital expenditures compared with prior art systems that require cutting machines at every spoke or end location. The present invention replaces expensive, bespoke key replacement kiosks and systems with low a cost tablet-based key data reading system. The centralized key blank inventory and management and centralized center of competencies for the key decoding, cutting, and delivery of the present invention further reduces logistical and supply chain complexities and costs. This centralization helps to reduce the impact of rapid turnover in retail environments, reduces or eliminates investment needed by spokes or end locations (e.g., businesses) for key cutting training, concentrates knowledge and training into a very small number of people at a hub location, and eliminates or significantly reduces the historical need for consumers to use specialized locksmiths or dealerships to get a key made.

In addition, a key code is identified, resulting in a quality, cut to specification or code key, rather than a key simply copied to its outline, or trace, with defects from wear and abuse and the so-called copy-of-a-copy effect. In one embodiment of the present invention integration of cloning of master key transponder and other information saves on the cost of a "token" and time needed to pair the key using a key programming tool. Furthermore, having the cloning of the transponder occurring locally in proximity to the customer's vehicle provides for cloning of keys that require "sniffing" of the key-vehicle conversation during the cloning process.

In a first embodiment of the present invention, a method for creating a duplicate of a master key based on an image of the master key keyblade captured at a remote access device, the image communicated to a central server via a communications network, the method comprising: presenting, at a remote access device, a user interface; inputting via the user interface a user input identifying a master key to be duplicated based on vehicle or master key identifying information; capturing, by an imaging device associated with the remote access device, master key image data; communicating the captured master key image data and user input data to the central server at a location other than the remote access device, the captured master key image data including at least one image of the master key; extracting, from the master key image data, key code information for use in cutting a duplicate key, the extraction including one or more feature extraction and correlation techniques using a key template; and cutting, at the key cutting machine, a duplicate of the master key using the extracted key code information.

The first embodiment may be further characterized in one or more of the following manners: wherein extracting key code information includes repositioning the at least one image of the master key by use of correlation using the key template; wherein the feature extraction includes determining at least one of a keyblade base and a keyblade tip and determining one or more measurements associated with at least one of the keyblade base and keyblade tip; wherein the feature extraction includes performing an automatic rotation of the master key image using a line identification process; wherein the feature extraction includes measuring a distance between two identified master key features; further comprising calculating, based at least in part on the feature extraction, a physical template of the master key keyblade; further comprising extracting a series of depth measurements related to cuts detected on the keyblade; further comprising calculating an error factor based on a distance from a detected edge of the keyblade to an ideal edge of the template; further comprising: calculating, based at least in part on the feature extraction, a physical template of the master key keyblade; extracting a series of depth measurements related to cuts detected on the keyblade; storing a set of temporary depth measurements and template; calculating a first error factor associated with the temporary results; repositioning the master key image; calculating a second error factor; and determining which of the first error factor and the second error factor has the least error; wherein repositioning the master key image includes one or both of rotating the image and sliding the image; further comprising adjusting template scale to minimize error in depth of cuts; further comprising generating a key order record and generating a QR code or other reference related to the key cutting order, wherein the key order record comprises the master key image data, the user input data and the QR code or other reference; further comprising extracting, by use of a mobile device, product related information from the QR code, the product related information including links to mobile app pages, URLs or webpages; further comprising consulting a set of stored master key code data to determine if the extracted key code data is valid; further comprising consulting a set of stored master key code data to determine if the extracted key code data is valid and, if determined valid then using a stored set of valid key code bitting pattern information to determine a bitting pattern for use in creating the duplicate key; further comprising delivering a duplicate key via a drone service directly to a customer location or to an affiliated retail location based on user input, GPS data or stored location data.

In a second embodiment of the present invention, a system for creating a duplicate of a master key based on an image of the master key keyblade captured at a remote access device, the image communicated to a central server via a communications network, the system comprising: a central server having a processor and memory and being adapted to communicate with a remote access device to receive key cutting services related information including an image of a master keyblade; a user interface generated by the central server and presented to a user operating the remote access device, the user interface allowing a user to input information related to a master key to be duplicated and including a set of master key image data captured by an imaging device associated with the remote access device; the central server adapted to receive the captured master key image data and user input data and having an image-based key code extraction module adapted to manipulate the master key image data and extract key code information for use in cutting a duplicate key, the extraction module including one or more feature extraction and correlation routines to extract the key code information using a keyblade template; a key cutting machine, at a location other than the remote access device and in communication with the central server, adapted to cut a duplicate of the master key using the extracted key code information.

The second embodiment may be further characterized in one or more of the following manners: wherein the image-based key code extraction module is adapted to reposition the at least one image of the master key by use of correlation using a key template; wherein the feature extraction routine is adapted to determine at least one of a keyblade base and a keyblade tip and determine one or more measurements associated with at least one of the keyblade base and keyblade tip; wherein the feature extraction routine is adapted to perform an automatic rotation of the master key image using a line identification process; wherein the feature extraction routine is adapted to measure a distance between two identified master key features; wherein the image-based key code extraction module is adapted to calculate, based at least in part on the feature extraction routine, a physical template of the master key keyblade; wherein the image-based key code extraction module is adapted to extract a series of depth measurements related to cuts detected on the keyblade; wherein the image-based key code extraction module is adapted to calculate an error factor based on a distance from a detected edge of the keyblade to an ideal edge of the template; wherein the image-based key code extraction module is further adapted to: calculate, based at least in part on the feature extraction, a physical template of the master key keyblade; extract a series of depth measurements related to cuts detected on the keyblade; store a set of temporary depth measurements and template; calculate a first error factor associated with the temporary results;

reposition the master key image; calculate a second error factor; and determine which of the first error factor and the second error factor has the least error; wherein the image-based key code extraction module is adapted to reposition the master key image based on one or both of rotating the image and sliding the image; wherein the image-based key code extraction module is adapted to adjust a key template scale to minimize error in depth of cuts; further comprising a reference code generator adapted to generate a QR code or other reference related to a key cutting order, the key order record comprising the master key image data, the user input data and the QR code or other reference; wherein the user interface is adapted to present at the remote access device product related information extracted from the QR code, the product related information including links to mobile app pages, URLs or webpages; further comprising a database of stored master key code data, and wherein the image-based key code extraction module is adapted to determine if the extracted key code data is valid based on master key code data stored on the database; further comprising a database of stored master key code data, and wherein the image-based key code extraction module is adapted to determine if the extracted key code data is valid based on master key code data stored on the database and, if determined valid then using a stored set of valid key code bitting pattern information to determine a bitting pattern for use in creating the duplicate key; further comprising a drone service for delivering a duplicate key directly to a customer location or to an affiliated retail location based on user input, GPS data or stored location data.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention but are intended to be exemplary and for reference.

FIGS. 9A-9B provide a system flowchart for an image-based method and system for extracting keycode information and creating duplicate vehicle keys according to the present invention.

FIGS. 10-12 provide various views of exemplary key types having various sets of key features and showing key cutting spacings and parameters in association with operation of the key cutting system of the present invention.

FIGS. 13-20 provide various views of exemplary key types having various sets of key features and showing key cutting spacings and parameters in association with operation of the key cutting system of the present invention.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides a low-cost, counter-mounted box replacement key ordering device, that uses a smart device, such as a smartphone, all-in-one computer, or tablet (e.g., a device that comprises a touchscreen interface and camera), a minimal clamp to hold a key blade from a master key in the box in front of the smart device's camera, and a low cost light source to capture an image of the master key to be used for providing a replacement key, which may be referred to as a key copy or cut key, to a customer or user operating the replacement key ordering device. In some embodiments, the light source may not be used and a printed grid positioned adjacent to the key may be used to provide scale and/or perspective for a captured image.

Figure 1:
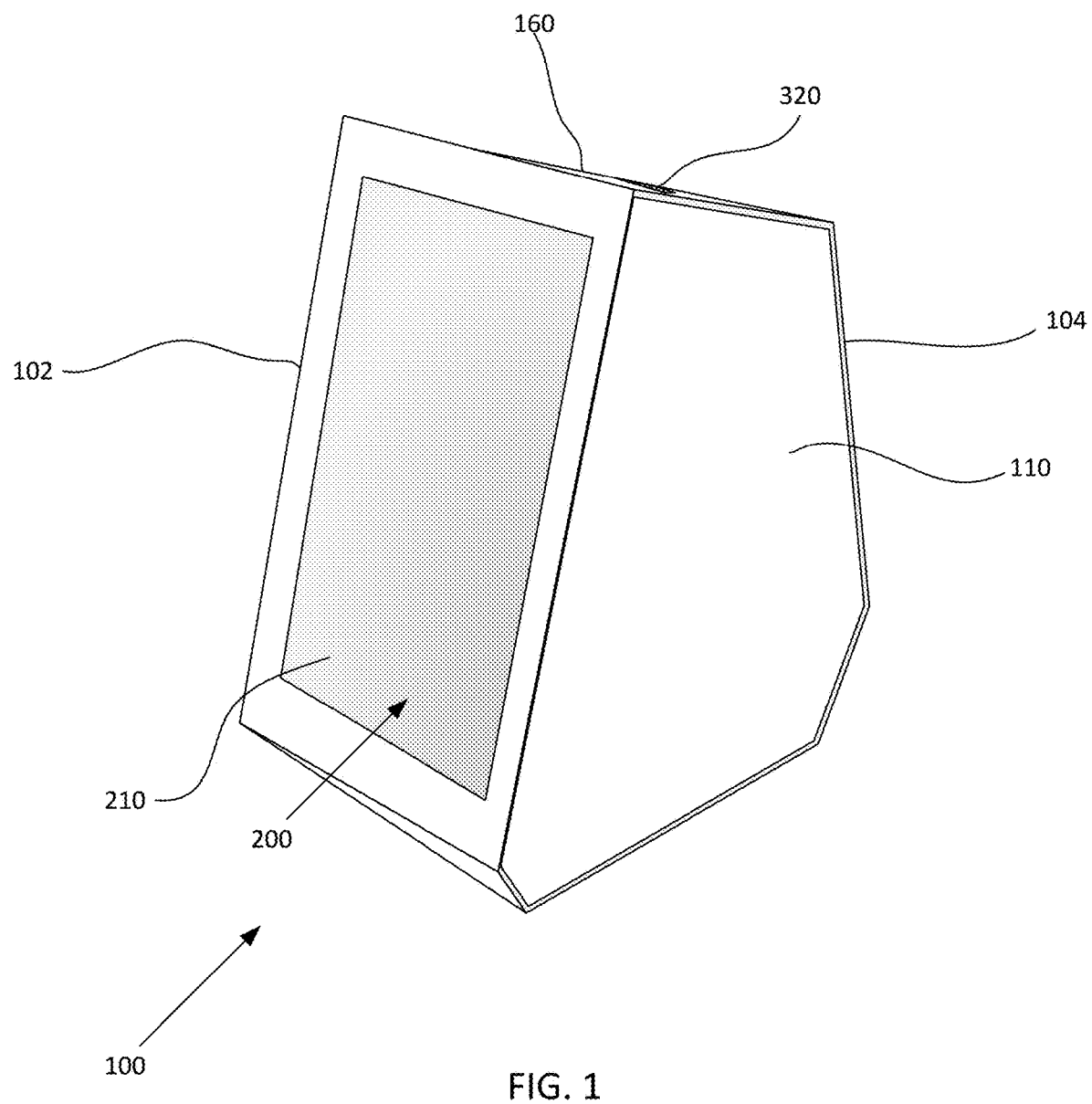
FIGS. 1 and 2 provide perspective views of an apparatus for obtaining a captured image of a master key according to the system and application of the present invention.
Figure 2:
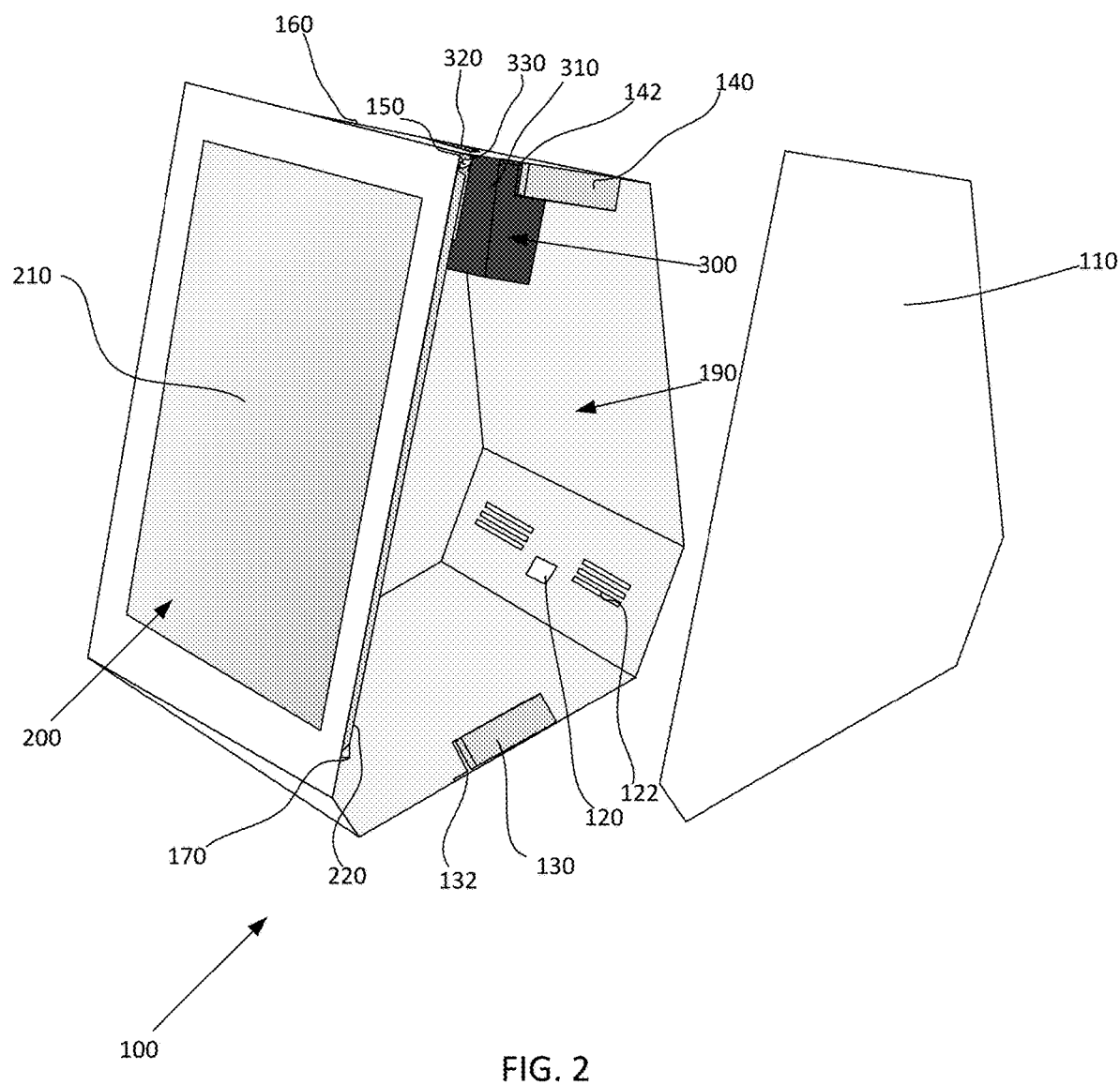
Figure 3:
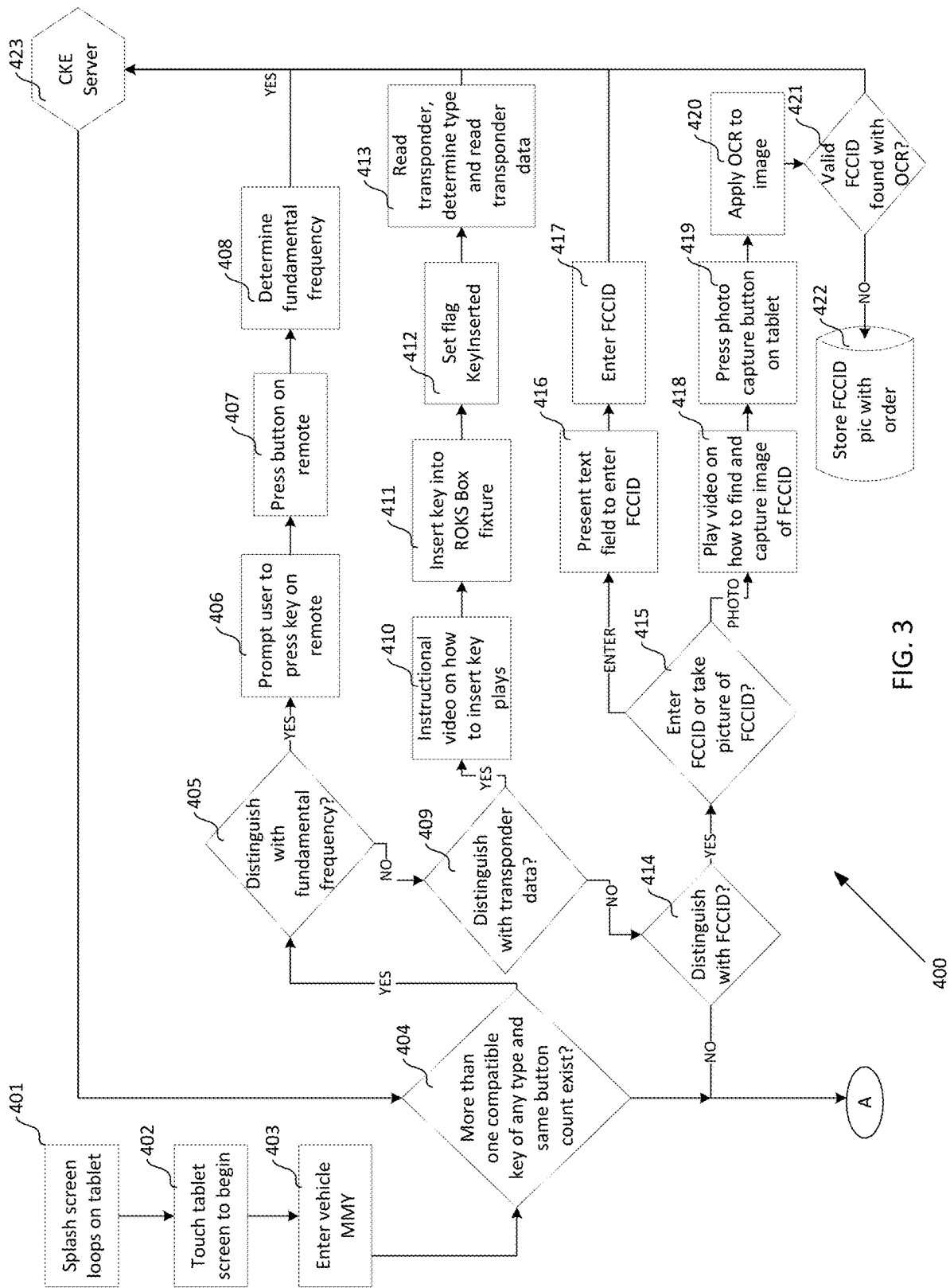
FIGS. 3-6 provide a series of flowcharts illustrating an exemplary set of processes for a user ordering a replacement master key according to the present invention.

With reference to FIGS. 1 and 2, perspective views of an apparatus for obtaining a captured image of a master key according to the system and application of the present invention are provided. The apparatus, replacement key ordering device 100, which may be referred to herein and in the figures as a remote order key system, retail order kiosk system, or Retail Optical Key Scanning ("ROKS") box 100 or as the ROKS device 100, comprises a housing 102 in which a smart device 200 is disposed at the front. The touch-screen or display 210 of the smart device 200, which is a tablet, smart phone, or other device capable of displaying information, receiving user inputs, communicating over a network, and capturing images, is accessible at the front of the housing 102. A key port or slot 320 is at the top 160 of the housing and provides for a key to be inserted into the clamp assembly 300 for holding the key blade of a master key to be imaged for copying. A removable side panel 110 is removably secured, such as by magnets, clips, or other suitable fasteners, in an opening 104 in one side of the housing 102.

The clamp assembly 300 is disposed at the top 160 of the housing 102 and in the interior space 190 of the housing 102, wherein the key channel 330 is correspondingly positioned with the key port or slot 320 such that the key blade of a master key to be imaged for copying may be inserted through the key port or slot 320 into the key channel 330 of the clamp assembly 300. The key channel 330 of the clamp assembly 300 aligns and positions the key blade of the master key such that an imaging device, such as a camera, of the smart device 200 may capture an image of the key blade. The key channel 330 may comprise a retaining mechanism such as a set of tabs, spring retention posts, springs, or elastic positioning members such as silicone protrusions to position and align a key blade within the key channel 330.

The body 220 of the smart device 200 is retained in the interior space 190 of the housing 102 by a set of retaining members 170 such that the display 210 of the smart device 200 is viewable and accessible via an opening at the front of the housing 102. A set of magnetic retainers 130 and 140, disposed on and secured to respective brackets 132 and 142, are used to releasably and magnetically secure the side panel 110 in place. A set of vents 122 and an access port 120 may be positioned at the back of the housing 102 to provide for a charging, power, and/or data cable to reach the smart device 200 and to provide for the exhaust of heat generated by the smart device 200 from the interior 190 of the housing 102. A set of one or more illumination devices 150 may be used to illuminate the key blade in the key channel 330 of the clamping assembly 300 for image capture by the smart device 200. Alternatively, a light source on the smart device 200, such as a flash, flashlight, or other rear light source, may be used. Additionally, alternatively or in addition to the illumination devices 150 a keyed scale or other indicators or markings may be placed on the clamping assembly 300 adjacent to the key channel 330 to provide for determining the scale, angle, size, and other attributes of the key blade of the master key.

The key ordering device 100 provides for a sales model that may be referred to as "hub and spoke." The "spoke" is, for example, an auto parts store, auto repair shop, or tire shop that is fixing a customer's car. The "hub" is, for example, a large retail parts store with a lot of inventory located within a few miles of the spoke, which has drivers regularly delivering parts from the hub to the spoke.

With reference now to FIGS. 3-6, provide a series of flowcharts illustrating an exemplary process 400 for a user ordering a replacement master key according to the present invention are provided.

At step 401 the customer using the device 100 at the spoke location encounters the device 100 displaying a looping splash screen on the display 210 of the smart device 200, shown in FIGS. 1-2. At step 402 the user interacts with the display 210 to begin entering information, and then in step 403 the user enters their vehicle data, such as vehicle make, model, and year ("MMY"). At decision 404 it is determined if more than one compatible key of any type and same key fob button count/configuration exist for the entered vehicle make and model.

If there are, at decision 405 it is determined if the key can be distinguished using a fundamental frequency for the key. If yes, at step 406 the user is prompted to press a button or key on the remote of the key fob for step 407. At step 408, the fundamental frequency is determined and sent to the server 423, such as a server operated in connection with key cutting services operated under the name CAR KEYS EXPRESS® ("CKE") CAR KEYS EXPRESS® is a registered trademark owned by iKeyless, LLC located at 828 East Market Street, Louisville Kentucky 40206. Server 423 then returns data (e.g., a determined key type based on the fundamental frequency) back to the device 100.

If the key cannot be distinguished by fundamental frequency, at decision 409 it is determined if the key can be distinguished by transponder data. To reduce the possibility of the customer selecting an incompatible key after the customer enters their vehicle data, it is determined by accessing information in a database if multiple keys, key fobs, or remotes with an integrated transponder could be compatible. This is done using an integrated transponder reader. A transponder type (e.g., "Megamos", "Philips 46", "HITAG2", "HITAG-AES", "DST-80", etc) is determined and additional transponder data (e.g., the value at page 0x10) are read and uploaded to the server to further filter the results of truly compatible keys/remotes. If this can be determined, in step 410 an instructional video on how to insert the key plays and in step 411 the user inserts the key blade into the ROKS device 100. In step 412 a flag is set that the key is inserted and in step 413 the transponder on the key is read, the transponder type is determined, the transponder data is read by an antenna or communication device in the clamping assembly 300 or in the smart device 200. The data is sent to the car keys express ("CKE") server 423, which then returns data (e.g., a determined key type based on the transponder data) back to the device 100.

If the key cannot be determined by the transponder data, at decision 414 it is determined if the key can be distinguished by the Federal Communications Commission identification ("FCCID"). To further reduce the possibility of the customer selecting an incompatible key, after the customer enters their vehicle data, if through database means it is determined that multiple keys/remotes with an integrated UHF transmitter could be compatible, the user may be prompted to provide the FCCID of the master key. To accomplish this, the user could be provided with a field to manually enter the FCCID or be allowed to capture and confirm a picture of the FCCID on the master key itself. If manually entered into a field or if through openly available OCR algorithms the FCCID is deciphered, the FCCID could be uploaded to the server to further filter the results of truly compatible keys/remotes.

If a picture is taken or an image is captured, the picture or image may be included with the key order to provide the operator who will be cutting or making the key at a remote location or at the hub with the ability to further manually validate that the ordered key is indeed compatible with the customer's vehicle. In combination with or in lieu of the FCCID information, the user may also be prompted to push a button on the remote as described above. An integrated UHF frequency detector is used to capture and determine the fundamental transmitter frequency. This fundamental frequency could be uploaded to the server to further filter the results of truly compatible keys/remotes.

If this can be determined, at decision 415 it is determined if the FCCID must be entered or if it can be captured by photo by the smart device 200. If it must be entered, at step 416 the user is prompted to input the FCCID in a text field or similar input in step 417. If it can be captured by photo, in step 418 a video is played showing how to find and capture the FCCID on the key or key fob. In step 419 the user is prompted to interact with a user interface element on the display 210 of the smart device 200 to capture an image of the FCCID. The captured FCCID is processed, such as by optical character recognition ("OCR") in step 420. In decision 421 it is determined if the captured FCCID is valid. If it is not valid it is stored as an image with the order in step 422, and if it is valid the data is sent to the car keys express ("CKE") server 423, which then returns data (e.g., a determined key type based on the FCCID) back to the device 100.

Figure 4:
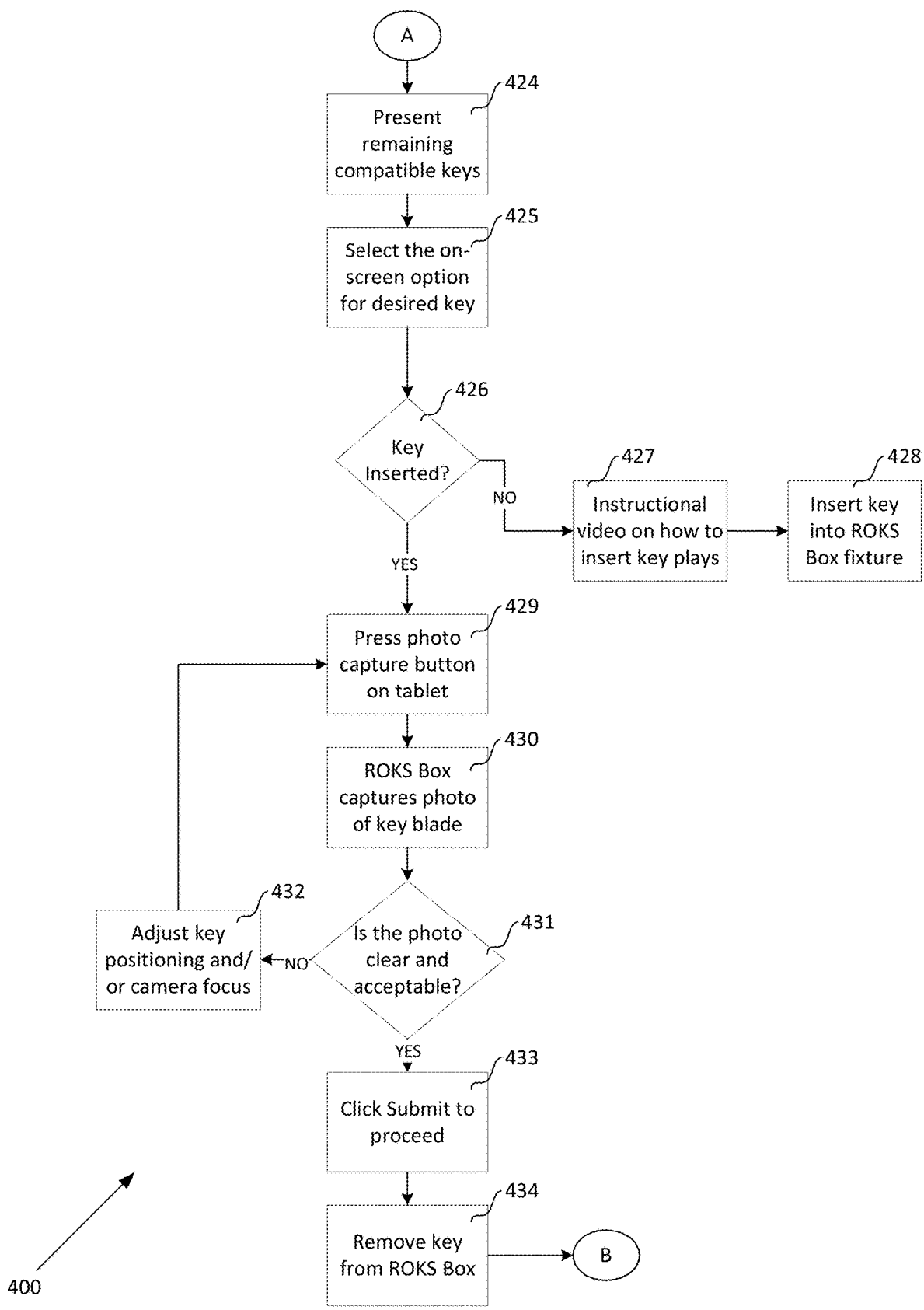
Figure 5:
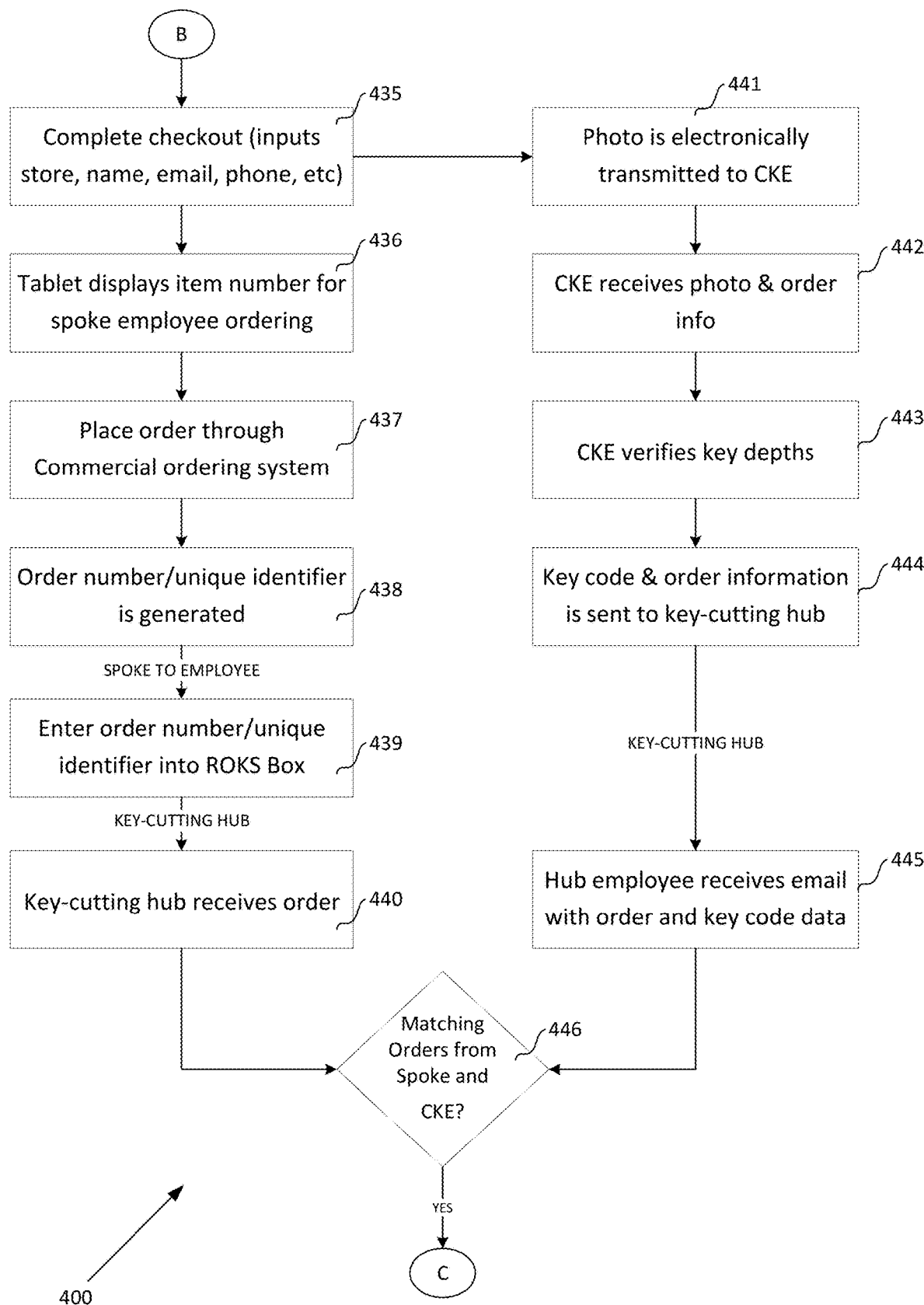
Figure 6:
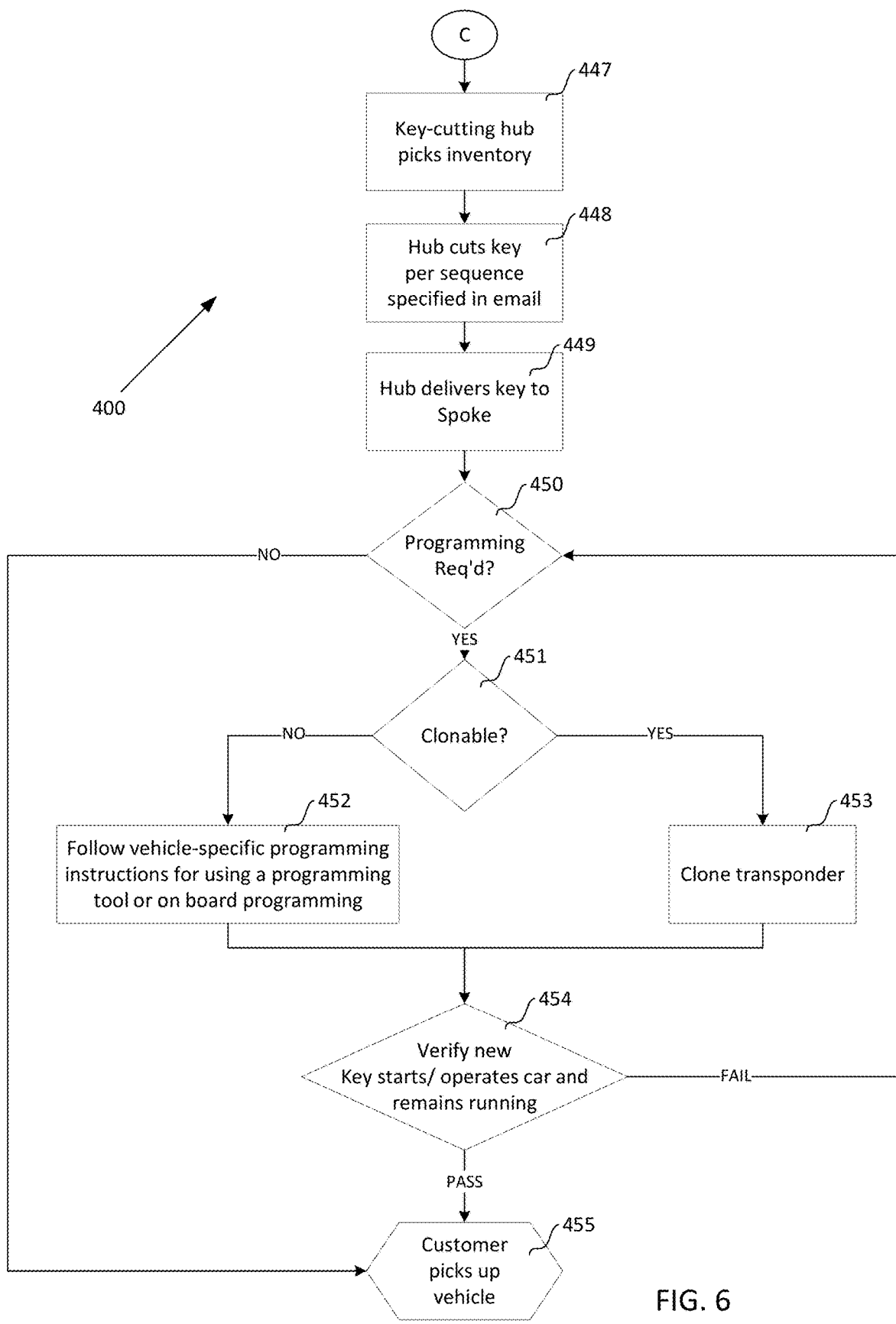

The process continues at A in FIG. 4. In step 424 the user or customer is shown images of possible keys/remote that are compatible with their vehicle, then chooses key/remote to order by selecting the on-screen option for the desired key in step 425. However, in some circumstance a customer may select the wrong key when ordering even though they have the master key in their hand and are presented with detailed images of the key being ordered, this possibility is mitigated using the determination processes described above.

If it is determined in decision 426 that the key is not inserted, at step 427 a video is played illustrating how to insert the key into the device 100 and in step 428 the user inserts the key. In step 429, if the key is inserted the smart device 200 in step 430 captures an image of the key blade when the user interacts with a user interface element such as a button in step 429. In decision 431 if the photo is acceptable the process proceeds to step 433 and if not in step 432 the user is prompted to adjust the key positioning and/or camera focus and the process returns to step 429. In step 433 the user is prompted to submit the order by interacting with a user interface element and then in step 434 removes the master key from the device 100. The process continues at B in FIG. 5.

In step 435 the checkout process for the order is completed by inputting or determining store information, user name, email and phone number in addition to other information. In step 436 the smart device 200 displays an item number for an employee at the spoke location where the device 100 is located to use in completing obtaining payment for and finalizing the order. In step 437 the order is placed through the commercial system at the spoke location business through their normal ordering and point-of-sale ("POS") software and systems. In step 438 an order number, which may be a unique identifier, is generated. The spoke employee then, in step 439, enters the order number into the device 100. The order with order number is then sent to the key-cutting hub location in step 440.

Prior to or contemporaneous to the order number and order being sent to the key cutting hub in step 440, in step 441 an ordered part number of the master key to be used in creating the replacement or cut key, the photo or image of the key blade and/or FCCID, transponder or fundamental frequency information, and other vehicle information are transmitted to a server such as a car keys express ("CKE") or iKEYLESS system. On the server side in step 442, through database means, this received order information is associated with the "CKE ID" corresponding to the combination of the vehicle information and ordered key part number. The CKE ID is a collection of records that associates a minimum of the key blade type (e.g., generic blank Ilco part number), depth and spacing data (DSD) for the cutting of the key, and key series. Key data is verified in step 444 and this information is then transmitted to the key cutting hub in step 445 where an employee at the hub receives an email with order and key code data.

Using the tablet's front camera, the user also captures image of and uploads to server a picture of the full key showing shape, size, and button configuration. This aids in validation at iKEYLESS (server side) and/or at the hub that the ordered key is indeed compatible with the customer's vehicle. Customers may be provided with the ability to upgrade (e.g., they have a transponder key and separate remote and would like to buy a head key) or downgrade (e.g., the customer has a smartkey and wants a transponder key) the ordered key type, and the image of the master key will allow the operator at iKEYLESS and/or the hub to verify that the ordered key has the same blade type, key series, and will successfully pair with the customer's entered vehicle.

At the remote server one or more automatically executed algorithms or computer image processing techniques alone or in combination with operator processing and verification are used to process the image or images to decipher bitting information.

It is important to note that different key types have different key features and characteristics. See the exemplary key types included at FIGS. 10-12 and described in more detail below. Depending on key type, the system will identify, locate and potentially measure from different key features. Keys that have shoulders are generally "shoulder-biased" keys and the key blade length is measured or determined from the key tip to the shoulder or bottom of the key shank. Keys that do not include a shank or a shoulder are generally "tip-biased" and the blade length is measured or determined from the bottom of the key head to the key tip. Complicating things further, although an original master key, e.g., the original OEM key provided with a new vehicle, is essentially identical in configuration to an OEM master key blank configuration, there may be a range of configurations that differ in some respect to this master configuration, e.g., although the key blade is a common length, the shank or portion of the key blade outside the bitting or cut area may be different lengths. Accordingly, it is important in key cutting to identify and determine precise points or features for cutting a bitting set of cuts on a duplicate key blade. Herein the system described will identify one or more "predetermined location(s)" based on the master key known or observed or based on user inputs and may consult a database of known OEM or supplier key codes and types. For example, a laser may target a predetermined location on a master key blade or duplicate key blank that is a feature or a known distance from a feature, e.g., shoulder location, distance from key tip, key head, proximity to the cut closest to the head or distal to the key tip. Although the invention may be described for illustration purposes in regards to use of the shoulder as a key feature employed, one possessing ordinary skill in the art will appreciate the use of one or more features may be employed with or in place of the shoulder feature.

Processing of the image of the master key to be copied comprises the first step of detecting the outline of the key in a 2-D space, broken up into best-fit line segments, then evaluating those segments according to a set of known key blank physical properties and applicable tolerances in order to auto-correct (e.g., de-skew, stretch/compress), auto-rotate, auto-align, and auto-scale the key image to either the tip or shoulder. The properties considered in this evaluation may include security type (e.g., edge-cut or high security), double or single sided, parallel and orthogonal surface locations, blade width, blade tip to shoulder distance, blade tip to first bit distance, blade shoulder to first bit distance, flat widths, cut angles, alignment surfaces (i.e., tip or shoulder), and MMY (in consideration of key wear likelihood and tendency).

The second step of determining the grid extents is then performed. Parallel lines, one for the top and one for the bottom, are assigned. Next, at a right angle to the top and bottom lines, tip and shoulder (if applicable to the key blank) lines are assigned.

The third step comprises overlaying a "grid" of the key blank's known depth and spacing data (DSD) onto the key image, where edge detection is then used to assign a bit position and bit number, along with a confidence value. The confidence may be a function of one or more of the following: known tolerances, thicknesses of detected shadows at each suspected bit position location; degree of agreement between opposite sides (in the case of a 2-sided symmetrical keyway); blade profile differences that can contribute to predictable differences in light and shadow thicknesses; bit error at each bit position using the absolute value of the error between the measured cut depth and the depth assigned to the detected bit value; and the sum of this same error across all bits.

Next, at each bit position, the bit number with the highest confidence value is output. This is the First Pass Bitting Output. The fourth step executes a pseudo closed-loop bitting determination or validation algorithm, which is iterative in nature and is critical in the evaluation and adjustment of the bitting output of each "pass" or processing step to ultimately arrive at a final bitting output with the highest confidence value. This algorithm consists of referencing known validation data against each "pass" of the validation algorithm and updating the confidence value at each bit position. For greater quality control, when the final bitting output is determined, to help minimize incorrect key bitting determination and unhappy customers, if the confidence value is below a predetermined threshold, an expert operator is flagged to manually check and/or adjust the deciphered key characteristics.

The primary validation data used is a lookup table of all valid bitting permutations, or "key codes" for the known key series. After each pass of the algorithm, a confidence value is calculated based on the bit error at each bit position between the absolute value of the difference between the measured cut depth at that bit position and the cut depth associated to the bit value at that same position of the potential matching key code. For any pass of the algorithm, a falsely deciphered key code match is inherently unlikely as the number of key codes in any particular key series is a small subset of all possible permutations that can be generated from the full space of bitting. For example, key series "40000-49999" used on TOYOTA 5-cut high security keys has 10,000 key codes, out of 59,049 (10 bit positions, 3 depths) possible permutations. So, in this example, the probability of wrongly deciphering a series of key cuts as any key code is about 17%. The probability of a false match is further decreased by applying the previously described predetermined confidence value limit to every potential match and selecting the potential match with the highest confidence value.

To aid the automatic algorithm and/or operator in reducing the number of passes of the algorithm (i.e., reducing the number of possible matching key codes), a key code/bitting search algorithm utilizes search criteria which may comprise one or more of the following: the number of bits; the maximum bit value allowed at the first bit position; the minimum and maximum bits values; the maximum adjacent bit variation (MACS); the minimum number of different bit values; the minimum difference between the highest bit value and lowest bit value; the maximum number of repeated adjacent bit values; the maximum number of times any bit value may appear; the likelihood that any two or more bit positions are the same bit values; and the possible range of values at any particular bit position. Given the low probability of a false match to a valid key code within a known key series and again using the key series "40000-49999" as an example, the key code/bitting search algorithm can reduce the list of potential matches from 10,000 to 3 with only a few of the search criteria being applied. At that point, the match with the highest calculated confidence value is selected.

When manual checking and adjustment occurs, over time, the algorithm logs its iterative failures and final successes to provide for experts to adjust the automatic algorithms, increasing the final pass bitting output accuracy.

Once the key code is determined, it is stored to memory. Then, the ordered key information along with the key code, bitting, image of the master key and not of the key blade itself, vehicle information, part number of ordered key, and order number are sent to hub for cutting. If this information matches from the spoke and from the server (iKEYLESS system), at decision 446 the process proceeds.

In step 447 an operator at the "hub" retrieves ordered key from inventory, which may be part of or integrated with a key duplication machine, and compares the picture of the master key with the ordered key to verify compatibility. In step 448, the operator cuts the key to code. In step 499 the hub location dispatches a delivery driver to provide the key to the "spoke".

If it is determined at decision 450 that the ordered key requires a pairing process, at decision 451 it is determined if the included transponder is cloneable. If a cloneable transponder does not exist within the ordered key, the driver OR spoke employee pairs the key to the customer's vehicle at step 452 using either vehicle specific On Board Programming procedures or a separate programming tool. If the transponder is cloneable, it may be cloned using an integrated or attached key cloning device in step 453. In step 454 it is determined if the new key starts the vehicle and operates the door locks. If the key passes or does not require programming it is delivered to the customer with their vehicle in step 455, if it does not, the programming step is reattempted.

With reference to the process 400 shown in FIGS. 3-6, the remote server at the iKEYLESS system, which may be at the hub that is cutting the key or may be at a separate location, attempts to determine key code from image in an automated fashion and assigns a confidence value of its success in doing so. If the determined confidence level is below a threshold, the order is flagged for manual review. An employee of the second location (iKEYLESS sever system location or hub location) manually determines the correct key code from the captured image. If the image is poor quality and/or the key is significantly worn, the pseudo closed-loop bitting determination/validation algorithm is used to find the most likely match. A manual version of this algorithm is provided to the operators that are decoding keys manually and this greatly increases their chance of success in manual decoding and decreases the time to do so.

Figure 7:
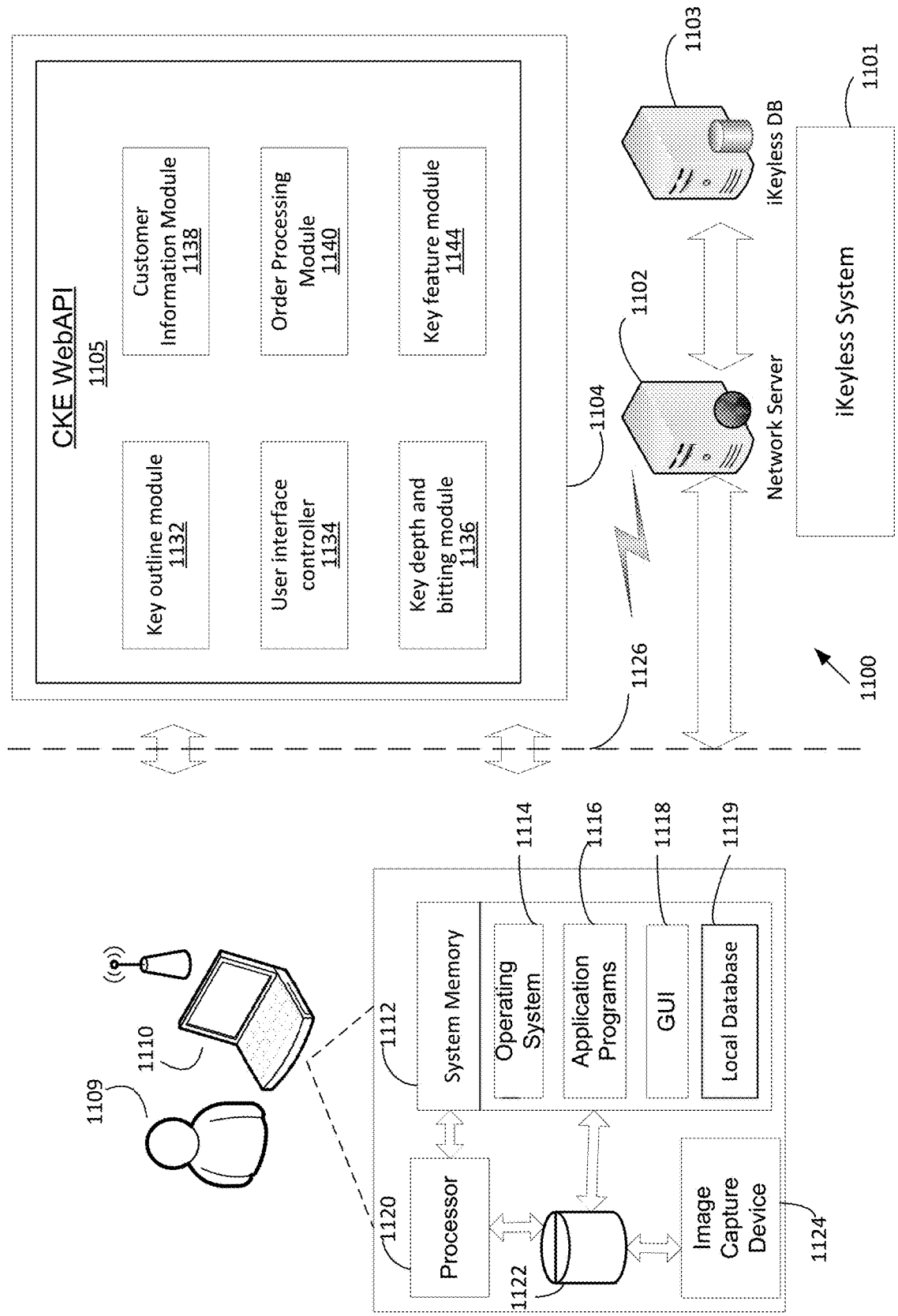
FIG. 7 provides a system diagram for a system for creating replacement vehicle keys according to the present invention.

With reference now to FIG. 7, a system diagram for a system 1100 for creating replacement or duplicate or reproduced or copy vehicle keys according to the present invention is provided. The system 1100 is the iKeyless System 1101 for storing and processing user-captured images of master keys to be used in creating key blade copies. The system 1100 comprises, for example, an iKeyless or Car Keys Express WebAPI (Web Application Program Interface) 1105 which may be part of a system environment 1104 run on network server 1102 and is the conduit, or interface, through which the remote access device 1110 and the iKeyless System 1101 sends and receives information (data and instructions) to/from the iKeyless DB 1103. Although shown as a laptop remote device, the remote access device may take a number of different forms having the key operating components described herein. For example the remote access device 1110 may be a remotely located kiosk or other stand-alone component or may be a smart phone configured to capture images in the manners described herein. The network server 1102 may be in communication with the iKeyless database 1103 which stores information used by the iKeyless System 1101 and may pre-process captured images for use in creating key blade copies. The network server 1102 may comprise a processor and a non-transitory memory which stores instructions that, when executed by the processor, transform the network server 1102 into a special purpose computing machine. The iKeyless System 1101 processes the raw images to identify a set of features associated with a master key in the images. The iKeyless System 1101 further comprises a key outline module 1132, a customer information module 1138, a user interface controller 1134, an order processing module 1140, a key depth and bitting module 1136, and a key feature module 1144, the features of which are discussed in further detail hereinbelow.

The iKeyless System 1101 may be in communication over a network, such as a local area network, wide area network, or the Internet by connection 1126 with a remote access device 1110. The remote access device 1110 is operated by the user 1109 and may be a stand-alone computing device such as a computing kiosk, computer, or point-of-sale device, which may comprise a smart device or computer such as a tablet or smart phone capable of receiving user input via a touch-screen display and of capturing an image via a rear facing camera. The remote access device 1110 comprises a processor 1120, system memory 1112, local storage 1122, and an image capture device 1124. Programs and software are loaded from the local storage 1122 into the system memory 1112 and may comprise an operating system 1114, application programs 1116, a graphical user interface ("GUI") 1118, and local database 1119. An application program 1116 communicates with the local database 1119 and provides a graphical user interface 1118 that comprises a set of user interface elements for interacting with the application program. The WebAPI 1105 provides a secure encrypted interface, exposed to the web, to/from which the remote access device application can send commands/requests and receive responses. The iKeyless System 1101 may be a desktop or a mobile application.

As a desktop application, the iKeyless System 1101 may be a software application compatible and compliant with Microsoft Windows operating systems such as Windows 7 and newer but may also be a web-based software-as-a-service ("SaaS") application that is compatible with web-browsers such as Google Chrome, Mozilla Firefox, and Microsoft Edge. The iKeyless System 1101 provides for the importing, processing, and manipulation of pictures to find key bitting quickly and effectively. The iKeyless System 1101 also provides for the detection of key bitting for house keys such as Schlage and Kwikset. The iKeyless System 1101 interfaces with the WebAPI 1105 to provide for the encrypted exchange of information between the iKeyless System 1101 and the Web API 1105. The iKeyless System 1101 provides for the input of an order number and a line item number and will retrieve order provided key information ("OPKI") to start a new order including the cutting and preparation of a replacement key. The iKeyless System 1101 can use the OPKI, modify the OPKI, and revert back to earlier versions of the OPKI. The OPKI used by the iKeyless System 1101 may be confined by or associated with a set of read-only key rules. These key rules comprise one or more of a number of bits, datum location (shoulder or tip), distances of datum to each bit, key bit cut depths max and min as measured from a keyway-defined reference, Maximum Adjacent Cut Specs (MACS), permitted or disallowed bit patterns, flat distance, shoulder to tip distance, blade width, and other applicable rules.

For a new job, within the user interface of the iKeyless System 1101, the iKeyless System 1101 implements automatic algorithms with manual overrides which are applied to all photos upon import or upon manual adjustment and which comprise: the automatic detection of key features (e.g., tip, shoulder (if applicable), bottom, top, blade width, shoulder to tip distance); the auto-registration of a key image including the auto-rotation of the key, skew detection and auto-adjustment (detection of non-parallel key features) and auto-correction, stretch/compression detection (using, for example, known rules of shoulder to tip distance and blade width) and auto-correction; automatic detection of cut depths with visual indicators of the nominal cut depths for the detected bitting; zoom and pan option to make close-up, fine adjustments to the above features and registration information, and in the zoom mode, all detected key features and key bit cut depths are shown with visually indicated tolerance limits; automatic detection and highlighting of key features and key bit cut depths that break key rules; and the comparison of key bitting of up to 4 other pictures at once to verify bittings are the same through all photos.

For a reorder job using the iKeyless System 1101, all previous job data is retrieved and displayed. By default, all automatic algorithms shall be disabled, but may be enabled by the user. Similar to a new job, manual overrides are provided to the user within the user interface for the manipulation of job data and of the image.

The automatic algorithms used by the iKeyless System 1101 can, without manual manipulation, extract key cut depths and key bitting data with a high degree of accuracy. Images captured and used for extracting key information including bitting information are saved and stored by the iKeyless System 1101. The performance of the iKeyless System 1101 may be audited, for example, to determine the performance of the automatic detection and auto-registration algorithms. For an audit, after the initial import of key images and application of all automatic algorithms (which are enabled for new job and disabled for a re-order job), all initial job data (e.g., feature locations, registration information, key bitting, cut depths, breaks rules (yes/no) on a feature by feature and bit by bit basis) is saved locally. Then, upon exiting and/or saving the job, all initial and final job data may be exported via the iKeyless WebAPI 1105 and processed externally to determine accuracy.

As a mobile application, the iKeyless System 1101 may be a mobile application that is compatible and compliant with at least Apple iOS and/or Android standards. The mobile application version of the iKeyless System 1101 interfaces with the iKeyless WebAPI 1105 to allow encrypted exchange of information. The mobile application for the iKeyless System 1101 provides a user interface for a user to create a new account or log into existing account, access previous orders for review of order progress or to re-order, take pictures of existing key, buy new keys, and buy upgrades to previous or existing key products. A user may order automotive keys or house keys through the mobile application. In addition to the features provided by the desktop application version of the iKeyless System 1101, the mobile application, and desktop application, also display slides or video clips showing a user how to take the best pictures of their key for the extraction of key information. This may include showing an example of what a "perfect" picture looks like. When taking an image of a key, camera orientation locked so that tilting mobile device will not auto-flip the screen, tilting the phone too far turns the screen red and prevents the taking of a picture, the flash defaults to being on with an option for it to be disabled, and a generic key silhouette is shown on the screen. After a picture is taken the picture displays an animation which traces the key outline to provide an indication to the user that the application has detected the outline of the key.

After key images have been captured and key information or data has been extracted, the user or customer may select an option to not have their key kept on file, to assign a nickname to key, to add a key purchase to a shopping cart, to remove items from the cart, to checkout, and to continue shopping. The user may also be presented with one or more "upsell" options to provide the user with the option to purchase additional keys and/or services based on what the customer has selected for purchase. For example, the user may be presented with the option to buy an extra remote for a vehicle, or buy an integrated key and remote instead of a separate key and remote. After an order has been entered, clicking on previous non-fulfilled orders allow user to see progress of order. For example, the user may be shown order statuses including: "Expert reviewing", "Expert cutting", and "Shipped".

Processing of the image or images of the master key to be copied comprises evaluating the image according to key bitting rules and determining if the key bittings determined from the image or images is within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A set of target key features are determined from this best possible outline to be used to create the key blade copy. The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a key blade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

The captured image is analyzed in real-time to ensure the image is of the quality needed for further processing and provides input back to the user. The application may notify the user that the picture of sufficient quality or may inform the user that they need to recapture the image. Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

Figure 8A:
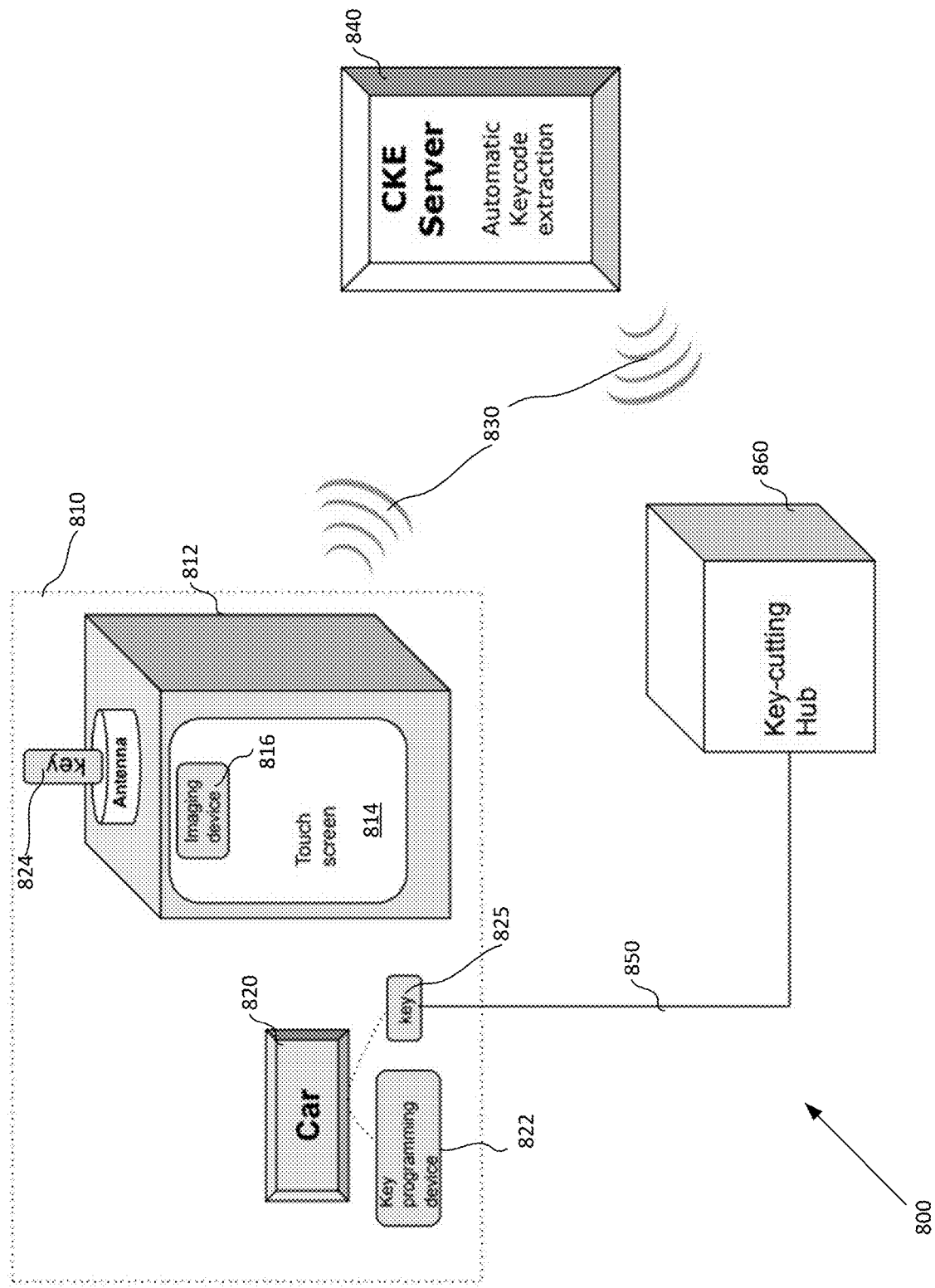
FIG. 8A-8B provide system diagrams for two exemplary image-based systems for extracting keycode information and creating duplicate vehicle keys according to the present invention.
Figure 8B:
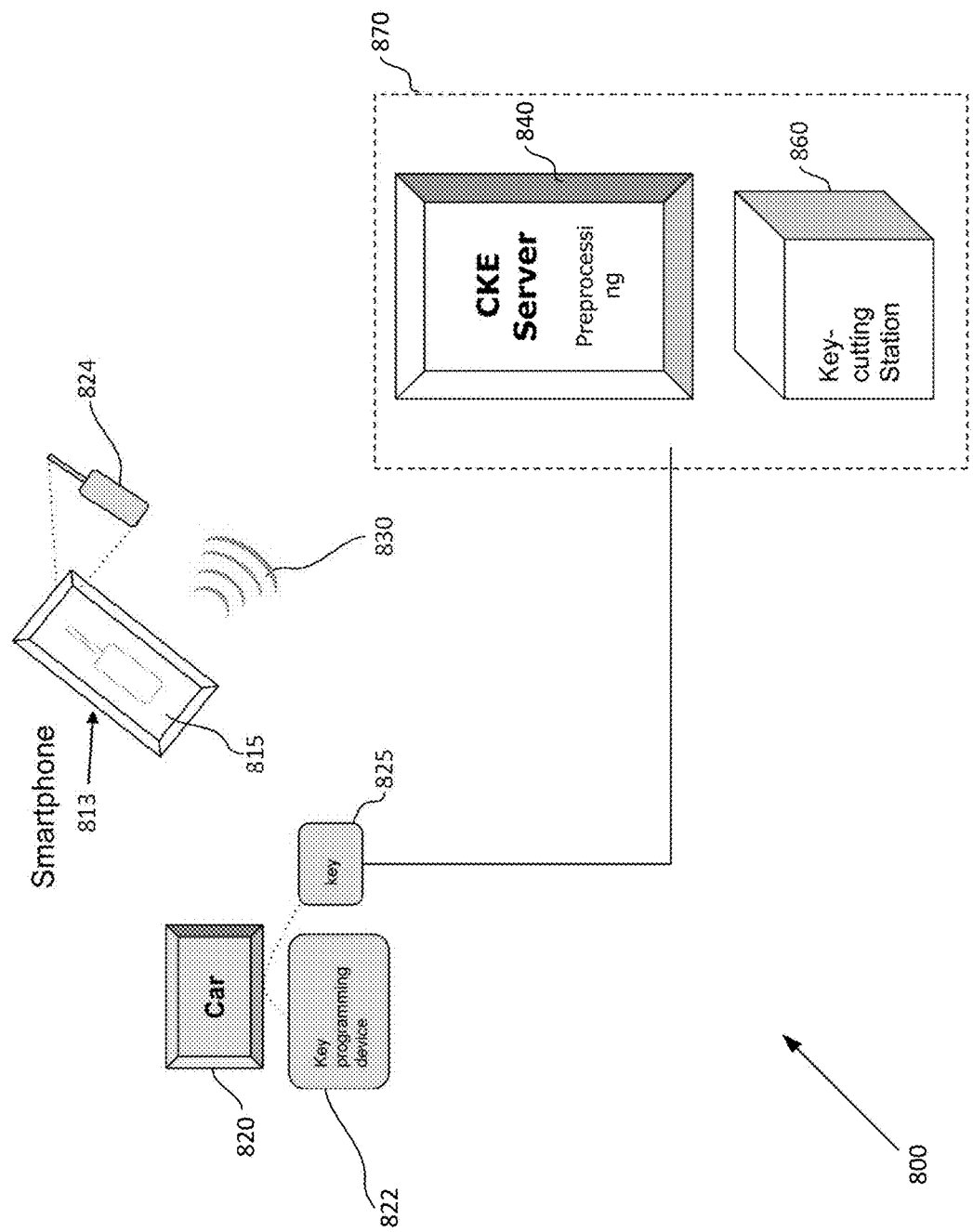

FIG. 8A-8B provide system diagrams for two exemplary image-based systems for extracting keycode information and creating duplicate vehicle keys according to the present invention.

With reference to FIG. 8A, key replication system ("KRS") 800 is exemplary of an image-based system configured to permit a user to capture images of a master key 824 at a key interrogation unit 812. The key data and imaging unit ("KDIU") 812 is adapted to establish an electrical communication over a network 830 with a central server, such as CKE server 840, that is remote from the KDIU 812. The CKE server processes the received captured images of master key 824 to detect and extract key code information from the master key 824 for duplicating. Based on the images, the CKE server determines an appropriate key blank for cutting and forwards the 1) key blank identifying information and 2) key code cutting information to a key-cutting hub, such as remote hub 860 over a communications network 830. With the information received from the CKE server 840, the key cutting hub 860 cuts a duplicate key 825 and sends/delivers the duplicate key 825 to a retail station at which the KDIU 812 is located or to an address provided by the user. The CKE server determines if the duplicate key is of the type requiring programming and, if programming is required, a programming tool 822 provided at the retail station at which the KDIU 812 is located may be used along with a set of instructions to program duplicate key 825 with vehicle 820. Alternatively, a dongle-based programmer may be provided with the duplicate key for programming by the user at the store where they pick up the duplicate key or at an address to which the key and the dongle programmer is mailed.

The duplicate key 825 may be programmed, such as by a programming device 822 that may be connected to a vehicle system via OBD port. Here, key replication system 800 comprises a local system 810 having a kiosk or stand-alone KDIU unit 812, which includes a touch screen 814 and an imaging device 816. For example, the KDIU 812 may be in the form of the Retail Optical Key Scanning ("ROKS") box 100 described above in connection with FIG. 1. The touch screen 814 may be alternatively a display with a separate user input component such as a keyboard. A master key may be inserted into a slot or other opening in the unit 812 or it may be placed in a scanning area contained within or adjunct to the KDIU 812. The imaging device 816 may consist of one or more cameras and, in more sophisticated applications one or more laser or laser stripe sensor device. The imaging device 816 is configured to take an image or images of the key profile of the master key inserted or placed in the unit 812 for imaging or scanning. In addition, a user may take one or a series of photos of a master key and load the images into the KDIU 812 such as by use of a smart phone having a camera and Bluetooth or other wireless connective technology. This is a variation even on the smartphone driven example of FIG. 8B.

Key blade images captured by the imaging device 816 or otherwise loaded into a memory of KDIU 812 may be sent to the CKE server 840 using a wireless network 830. The CKE server 840 applies detection and extraction processes, such as described below, to detect a keycode associated with the master key 824 imaged. This processing of the captured images may include comparing the extracted data against a database or lookup table of known valid keycodes such as valid OEM keycodes that are, as discussed above, a small subset of the potential keycodes given, for example, the set of depth cuts, depths and locations. Processing of the image or images of the master key 824 to be copied comprises evaluating the image according to key bitting rules and determining if the key bittings determined from the image or images are within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A master set of actual or "valid" key codes within a set of potential codes associated with key bitting positions and depths may be used to ascertain if acquired master key data is valid. If the captured image and associated data do not match an actual valid key code for an identified make, model and year for a vehicle then the system can issue a warning and stop short of cutting a duplicate key.

A first exemplary replication system consists of a KIOSK with processor system for providing key duplication processing information related to master keys for duplicating is described in U.S. Provisional Patent App. 62/970,419, entitled SYSTEMS AND METHODS FOR CREATING REPLACEMENT VEHICLE KEYS, Determan et al., filed Feb. 5, 2020 (113083.018PRV) as incorporated by reference. The ROKs box as described herein uses an imaging device, such as a camera, to take one or more photos of the master keyblade inserted in the key holder or scanning compartment. Unit 812 of FIG. 8 is an example of a ROKs box and may be configured to capture multiple images with different camera settings and/or light settings to capture the master key profile. An image or combination of images suitable for duplication of the master key 824 may be based on the type of key profile, i.e., some key types or key profiles may require more than one image. Preprocessing of images is done by different region extraction and feature extraction techniques which results in automatic cropping and rotating of images as described in the flow chart of FIG. 9 below. Captured images are processed by an iterative software algorithm based on maximum likelihood principle as explained in the flowchart below and with reference to FIG. 9. The algorithm uses template matching for each depth and readjusts the base calculation and/or start of bit calculation if it is needed. Last step is executed iteratively to minimize the error.

Potential use of the image processing algorithm mentioned above would be in the second key replication system—consists of a smartphone with camera as an imaging device. One or more images of the customer's keyblade will go through preprocessing analysis. Based on this analysis images will go through preliminary preprocessing including image denoising, rotating and effective region extraction. This process will be followed by an image screening algorithm to detect the best suitable image. The judgment of image screening is based on precalculated classifiers. The selected image will be processed through the key profile/keycode detection algorithm to get the final keycode for the master key to replicate.

With reference to FIG. 8B, and alternative representation of key replication system 800 also provides an image-based system configured to permit a user to capture images of a master key 824 for use by a central server, CKE server 840, in making a duplicate key 825. Instead of the KDIU 812, the embodiment of FIG. 8B uses a smartphone 813 having a touch sensitive screen 815 to capture images of a master key 824. The smartphone 813 may establish an electrical communication over a network 830, including a mobile telephony communications network, with the central server 840, that is remote from the smartphone 813. The CKE server 840 processes the received captured images of master key 824 to detect and extract key code information from the master key 824 for duplicating. Based on the images, the CKE server 840 determines an appropriate key blank for cutting and forwards 1) the key blank identifying information and 2) the extracted key code cutting information to a key-cutting station 860 co-located with and in communication with the CKE Server. With the information received from the CKE server 840, the key cutting hub 860 cuts a duplicate key 825 and sends/delivers the duplicate key 825 to a retail station or to an address provided by the user. The CKE server 840 determines if the duplicate key 825 is of the type requiring programming and, if programming is required, a programming tool 822 provided at a retail station may be used along with a set of instructions to program duplicate key 825 and pair the key with vehicle 820. Alternatively, a dongle-based programmer 822 may be provided with the duplicate key 825 for programming by the user at an address to which the key and the dongle programmer are mailed.

Correlation

FIGS. 9A/9B provide a system flowchart for an image-based method and system for extracting keycode information and formatting vehicle keys according to the present invention. With reference to FIG. 9A, an image based key code extraction system and method 900 are shown in a flow chart format. For reference, a key diagram 901 is shown to identify features of typical key blade that may be used in connection with the image-based key code extraction process. The image-based key code extraction system 900 starts at step 902 with the system, e.g., central CKE server 840, receiving, e.g., from the ROKs box type unit 812 or the smartphone 813 over the network 830, key blade image data and information related to a master key, e.g., master key 824, and may include feature data related to features shown in key diagram 901. At step 904 the system crops out blade region areas and performs other correcting steps as needed including rotating or repositioning the keyblade image relative to the detection mechanism. The repositioning is done by correlation using a template. In one manner, the system applies feature extraction technique(s) such as used in image analysis, computer vision, or digital image processing. The auto-rotation is done, for example, by detection of longest lines using Hough Transform or Hough Line Transform. While line identification is often the feature relied upon, other shapes or artifacts common to the type of device being detected may be used. At step 906 the system measures the base of the keyblade of master key 824 and locates the tip of the keyblade as important location and positioning information. In one exemplary embodiment, the measurement of the base is done by edge detection using correlation (detects the top and the bottom then measures the distance between the two features. The tip may then be detected by correlation. An exemplary keyblade template and location identifying parameters are illustrated in the figure provided at reference 930.

At step 908 the system calculates a physical template of the keyblade. Determining and knowing the width the base, the system is configured and adapted to scale the template. Determining and knowing the location of the tip, the system is configured and adapted to determine where to position or locate the template in space. At step 910 the system extracts a series of depth measurements related to cuts detected on the keyblade. The extraction is done by edge detection using correlation. After extraction, the system calculates an error factor based on the distance from the detected edge to the ideal edge (the closest edge on the template). At step 912 the system stores a set of temporary results and the calculated physical template of the keyblade. At step 914 the system determines whether the image has been rotated to minimize error from depth of cuts. The system preferably performs the re-rotation once and stores the occurrence, i.e., the system remembers performing the re-rotation. Optionally, the system may otherwise reposition to minimize error from depth of cuts. If the determination is no, the system at step 916 re-rotates the image to minimize error from depth of cuts and returns to the flow just above step 906 for further processing. For example, the determination is based on distance from the detected edge to the ideal edge (the closest depth on the template). The system performs a linear interpolation on these distances and uses the angle of the resulting line to re-rotate the key photo. If the determination is yes, then the process proceeds to step 917 where the system further adjusts by sliding the template to the right and stores a temporary set of results in an iterative process. For example, the system slides the template by two pixels to the right.

At step 918 the system determines, for example, if the result of step 917 is the first time sliding the template or if new results are better than previously stored results and the system has not reached a maximum number of right slides. For example, the system checks if the newly calculated error factor is lower than the stored one. This process is based on a maximum number of slides and the system is configured to stop sliding when the error factor starts increasing. In this manner the system applies an iterative approach to find the most desired positioning of the template. If the determination of step 918 is "yes," then the Process returns to the flow just above step 908 and calculates the physical template of the keyblade. If the determination of step 918 is "no," then the system proceeds to step 919 at FIG. 9B and restores the previous results in template.

Figure 9B:
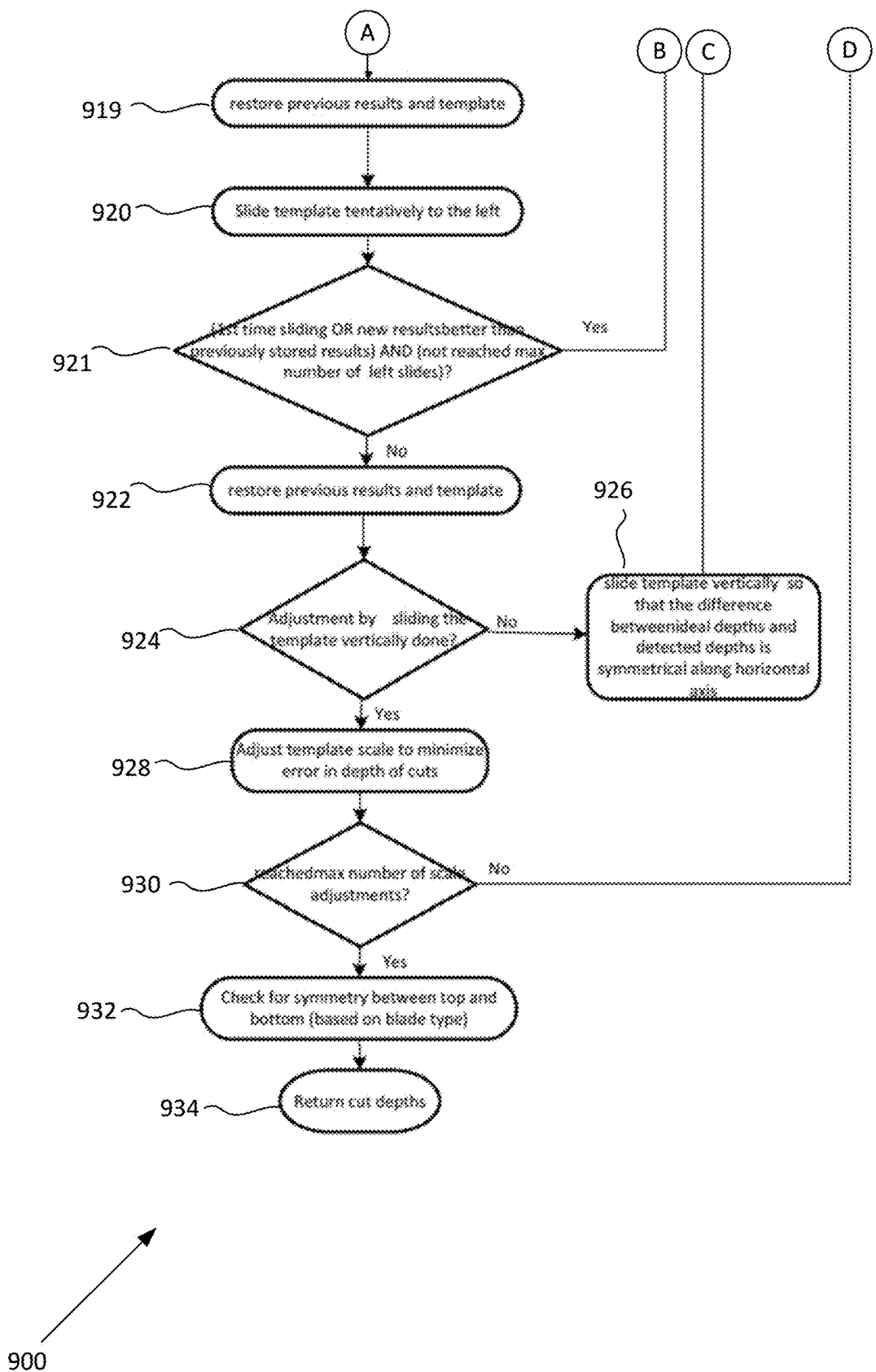

With reference to FIG. 9B, at step 920 the system slides the template tentatively to the left and proceeds to step 921. At step 921 the system determines if first time sliding OR new results better than previously stored results AND have not reached maximum number of left slides. For example, the system checks if the newly calculated error factor is lower than the stored one. This process is based on a maximum number of slides and the system is configured to stop sliding when the error factor starts increasing. In this manner the system applies an iterative approach to find the most desired positioning of the template. If the determination of step 921 is "yes," then the Process returns to the flow just above step 908 and calculates the physical template of the keyblade. If the determination of step 921 is "no," then the system proceeds to step 922 and restores the previous results and template.

At step 924 the system determines whether the iterative adjustment by sliding the template vertically is completed. If the determination is "no" at step 924, the process proceeds to step 926 and slides the template vertically until the difference between ideal depths and detected depths is symmetrical along a horizontal axis and returns to the flow above step 908 and calculates the physical template of the keyblade. For example, for each cut, the system calculates the half-point between the detected top edge and the detected bottom edge. The system then calculates the median height of these positions over each cut of the blade. The system then repositions the template to place the median vertical position calculated at the center of the blade width. If the determination at step 924 is "yes," the system proceeds to step 928 to adjust the template scale to minimize error in depth cuts. For example, for each cut, the system calculates the signed distance between the detected edge and the closest depth on the template. The system then averages the calculated distances over each cut of the blade. The system then adds this average to its scaling factor, and recalculates the template based on this new scaling factor. The system at step 930 determines whether a maximum number of scale adjustments has been reached, such as by having a threshold parameter. If the determination at step 930 is "no," then the system returns to the flow above step 908 and calculates the physical template of the key blade again. If the determination at step 930 is "yes," then the system proceeds to step 932 and checks for symmetry between top and bottom, based on blade type, and at step 934 returns the cut depths. The system checks that the discretized depths for the top are the same as the discretized depths for the bottom.

Figure 10:
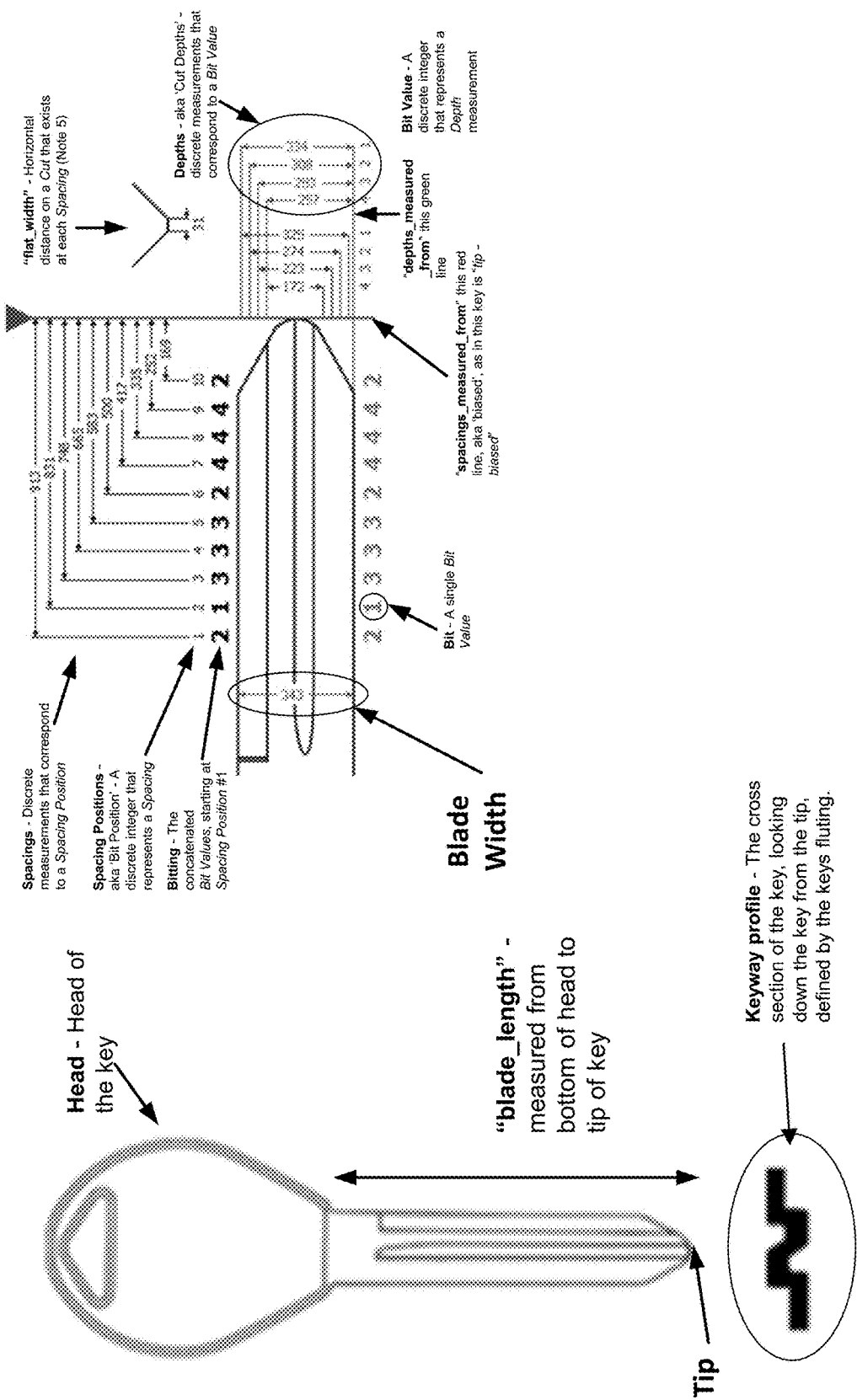
Figure 11:
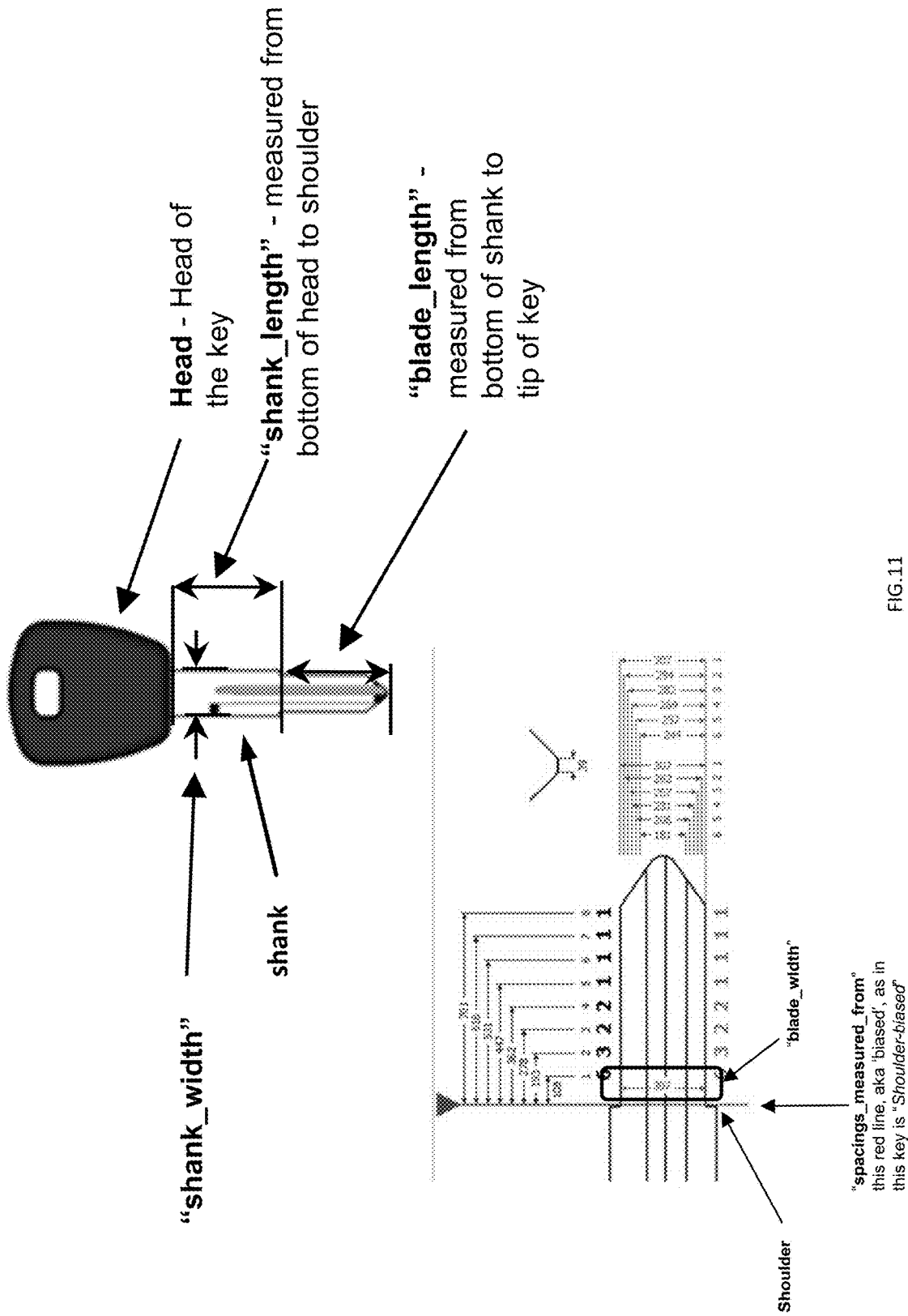

FIGS. 10-12 provide views of exemplary key types having key features and showing spacing and other criteria used in detecting positions, targeting lasers, and other key cutting operations. FIG. 10 illustrates an exemplary edge cut, tip-biased key type having a key head feature and a blade feature with an associated blade length and tip. An exemplary key profile is shown along with a set of spacing and bitting pattern and cutting criteria, e.g., depth of cut. FIG. 11 illustrates an exemplary shoulder-biased key type having a key head feature, a shank feature, a shoulder feature, and a blade feature with an associated blade length and tip. An exemplary set of spacing and bitting pattern and cutting criteria are also illustrated. FIG. 12 illustrates an exemplary high security (HS) tip-biased, double-sided key type having a blade feature with an associated blade length and tip. An exemplary key profile is shown along with a set of spacing and bitting pattern and cutting criteria.

FIGS. 13-20 provide screens in connection with the vehicle/key identification and selection process of the present invention and are exemplary of a selected type of vehicle—in this case a 2011 Toyota Camry. Certain kiosks or other stand-alone key interrogation machines will come equipped with transponder detection capabilities (determine if the master key is a transponder type or not) and others may not be equipped with this capability.

For Master Key Identification, a decision tree (set of questions) may be autogenerated for each MMY based on factors that exist in the database and a predetermined priority. The higher the priority, the more apparent the factor is and would therefore be asked first. For example, if the kiosk or machine has a transponder reader, the factor of "TRANSPONDER" is highest since this requires no input from the user. If the kiosk or machine does not have a transponder reader, the next most apparent factor to the user is whether the user starts their car using "Push to Start". The factor with the lowest priority would be, for example, the FCC ID, since this can sometimes either wear off or be hard to find (e.g., inside the battery compartment).

An exemplary sequence of user questions or prompts associated with FIGS. 13-20 is shown below. In one manner, preferably a hierarchical sequence for efficiency, may be presented via user interfaces having selectable or active elements to allow user input (which may be either selecting one button among a group of buttons or a text field for entering text responsive to the question or prompt presented on the display of the machine. In the following example journey, a 2011 Toyota Camry is selected. Notice that the decision tree provides a hierarchical set of questions that are used to drill down to the minimum number of products until all relevant questions remain. What is then ideally left, is a set of products that are visually easily distinguishable from each other. In this example, an exemplary hierarchical sequence associated with a MMY vehicle having an ID 527372011 and being a "Toyota" make, "Camry" model and "2011" year as selected based on user input. Associated with this MMY vehicle is the following sequence of prompts forming a decision tree to navigate the user efficiently through the vehicle and key identification process. The makeup of the prompts associated with a given MMY vehicle will preferably depends on the type of vehicle and the type of corresponding matching available key types associated with the vehicle so as to avoid unnecessary prompts and avoid user frustration.

```
{
    "vehicle": {
```

-continued

```
    "id": 527372011,
    "v_make": "Toyota",
    "v_model": "Camry",
    "year": 2011
},
"decision_tree": {
    "factor": "TRANSPONDER",
    "text": "This message should not be displayed.",
    "img": null,
    "options": {
        "DST 40": {
            "items": [
                "TOY KEY 085 COMBO"
            ],
            "transponder_command": "b"
        },
        "DST 80": {
            "items": [
                "TOY KEY 800",
                "TOY KEY 085.25 COMBO",
                "TOY KEY 085.75 COMBO",
                "TOY KEY 801"
            ],
            "question": {
                "factor": "BLADE_STAMP",
                "text": "Is there a letter stamped on your key blade? Please select it below. If not, please select None.",
                "img": null,
                "options": {
                    "DOT": {
                        "items": [
                            "TOY KEY 085.25 COMBO"
                        ]
                    },
                    "G": {
                        "items": [
                            "TOY KEY 800"
                        ]
                    },
                    "None": {
                        "items": [
                            "TOY KEY 085.75 COMBO",
                            "TOY KEY 801"
                        ],
                        "question": {
                            "factor": "FCCID",
                            "text": "Does your key list a 'FCC ID' on the back? If yes, please select it. If no, please select None.",
                            "img": null,
                            "options": {
                                "HYQ12BBY": {
                                    "items": [
                                        "TOY KEY 085.75 COMBO"
                                    ]
                                },
                                "None": {
                                    "items": [
                                        "TOY KEY 801"
                                    ]
                                }
                            }
                        }
                    }
                }
            },
            "transponder_command": "r"
        },
        "None": {
            "items": [
                "TOY KEY 085 COMBO",
                "TOY KEY 350",
                "TOY KEY 800",
                "TOY KEY 085.25 COMBO",
                "TOY KEY 085.75 COMBO",
                "TOY 130 SMARTKEY",
                "TOY KEY 801"
            ],
            "question": {
                "factor": "PROXIMITY",
```

-continued

```
            "text": "Do you start your vehicle by pushing a button on your dash?",
            "img": null,
            "options": {
                "Yes": {
                    "items": [
                        "TOY KEY 350",
                        "TOY 130 SMARTKEY"
                    ],
                    "question": {
                        "factor": "FCCID",
                        "text": "Does your key list a 'FCC ID' on the back? If yes, please select it. If no, please select None.",
                        "img": null,
                        "options": {
                            "HYQ14AAB": {
                                "items": [
                                    "TOY 130 SMARTKEY"
                                ]
                            },
                            "None": {
                                "items": [
                                    "TOY KEY 350"
                                ]
                            }
                        }
                    }
                },
                "No": {
                    "items": [
                        "TOY KEY 085 COMBO",
                        "TOY KEY 800",
                        "TOY KEY 085.25 COMBO",
                        "TOY KEY 085.75 COMBO",
                        "TOY KEY 801"
                    ],
                    "question": {
                        "factor": "BLADE_STAMP",
                        "text": "Is there a letter stamped on your key blade? Please select it below. If not, please select None.",
                        "img": null,
                        "options": {
                            "DOT": {
                                "items": [
                                    "TOY KEY 085 COMBO",
                                    "TOY KEY 085.25 COMBO"
                                ],
                                "question": [ ]
                            },
                            "G": {
                                "items": [
                                    "TOY KEY 800"
                                ]
                            },
                            "None": {
                                "items": [
                                    "TOY KEY 085.75 COMBO",
                                    "TOY KEY 801"
                                ],
                                "question": {
                                    "factor": "FCCID",
                                    "text": "Does your key list a 'FCC ID' on the back? If yes, please select it. If no, please select None.",
                                    "img": null,
                                    "options": {
                                        "HYQ12BBY": {
                                            "items": [
                                                "TOY KEY 085.75 COMBO"
                                            ]
                                        },
                                        "None": {
                                            "items": [
                                                "TOY KEY 801 "
                                            ]
                                        }
                                    }
                                }
                            }
                        }
                    }
                }
            }
```

```
                }
              }
            }
          }
        }
      }
    },
    "unfiltered_skus": [ ]
}
```

With reference to FIGS. 13-20 and the sequence listed above, a series of screens guide a user through a series of prompts to confirm the identity of the vehicle type associated with a master key and a particular master key type desired to be duplicated or replaced. Note that for any given MMY vehicle there may be more than one available key type and each of the available key types may have a different feature set.

FIG. 13 illustrates a screen associated with a user interface having a set of selectable elements for receiving user inputs related to MMY information. In this example the user has selected from sets of respective pull-down lists "Toyota" as the make, "Camry" as the model and "2011" as the year of the target vehicle associated with the master key to be duplicated. Using the decision tree listed above, in a machine having a transponder, the user inserts the master key into an insertion feature or otherwise presents the master key to the kiosk or machine. Beginning with the factor "Transponder", the machine determines if the key is a transponder type key and if so follows the decision tree and presents the user with interfaces directed to a transponder type key. Based on the decision tree listed above, the machine detects the transponder key as a DST40 type and presents to the user the screen shown at FIG. 14 related to the corresponding "TOY KEY 085 COMBO type key. Alternatively, based on the decision tree listed above, if the machine detects the transponder key as a DST80 type a different set of prompts is used. As shown at FIG. 15, the machine presents to the user the screen related to the DST80 transponder type and prompts the user to enter information confirming if there is a letter or other indicia stamped on the key (here letter "G" or a dot) and showing an image to help the user find any such letter or indicia stamping. The user selects the element related to an identified stamping "DOT" or "G" and if there is none the user inputs "None."

FIG. 16 shows a set of screens presented based on the input of the user in screen of FIG. 15 and based on the decision tree. Here, if "DOT" is input, the user is presented with the key type "TOY KEY 085.25 COMBO." Here, if "G" is input, the user is presented with the key type "TOY KEY 800." Here, if "None" is input the user is presented with a further input selection screen with the prompt "Does your key list a 'FCC ID' on the back? If yes, please select it. If no, please select None." Upon selecting "HYQ12BBY" as the FCC ID on the key, the user is presented with the key type "TOY KEY 085.75 COMBO." If the user selects "None" then the machine presents the key type "TOY KEY 801."

Figure 17:
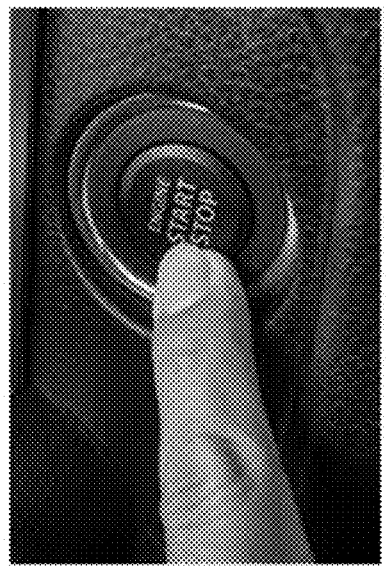

FIGS. 17-20 relate to screens and prompts presented to users by a machine that does not have transponder sensing capability. FIG. 17 shows a screen prompting the user to identify if the target vehicle associated with the key is equipped with "Start" push button ignition feature and the user enters "YES" or "No." If the user enters "Yes" the machine steps through the screens shown in FIG. 18 and presents the user with the prompt "Does your key list a 'FCC ID' on the back? If yes, please select it. If no, please select None." Upon selecting "HYQ14AAB" as the FCC ID on the key, the user is presented with the key type "TOY 30 SMARTKEY." If the user selects "None" then the machine presents the key type "TOY KEY 350."

If the user enters "No" to the prompt shown on screen at FIG. 17, the machine presents the user with the screen shown in FIG. 19 and presents the user with the prompt "Is there a letter stamped on your key blade? Please select it below. If not, please select None." In this example the step confirms if there is a letter or other indicia stamped on the key (here letter "G" or a dot) and showing an image to help the user find any such letter or indicia stamping. The user selects the element related to an identified stamping "DOT" or "G" and if there is none the user inputs "None."

Figure 20:
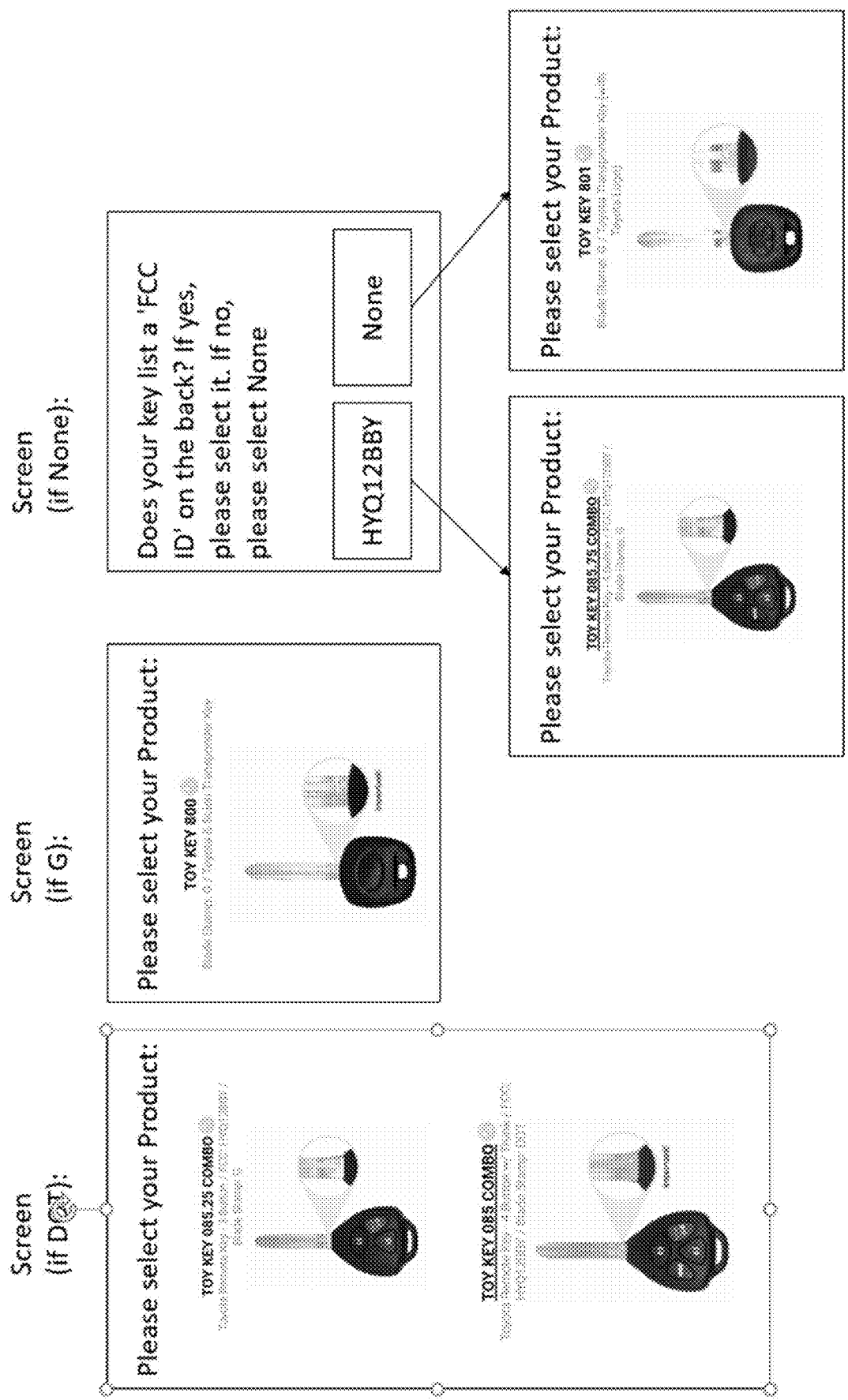

FIG. 20 shows a set of screens presented based on the input of the user in screen of FIG. 19 and based on the decision tree. Here, if "DOT" is input, the user is presented with two key types "TOY KEY 085.25 COMBO" and "TOY KEY 085 COMBO." Here, if "G" is input, the user is presented with the key type "TOY KEY 800." Here, if "None" is input the user is presented with a further input selection screen with the prompt "Does your key list a 'FCC ID' on the back? If yes, please select it. If no, please select None." Upon selecting "HYQ12BBY" as the FCC ID on the key, the user is presented with the key type "TOY KEY 085.75 COMBO." If the user selects "None" then the machine presents the key type "TOY KEY 801."

QR Code Enabled Service. The key code extraction and key configuring/duplicating inventions described herein may be used in connection with a kiosk or other on-site retail key selection and ordering service involving use of QR codes or matrix or bar codes or other image or machine-readable codes—collectively or alternatively referred to herein as "QR-code service." Matrix bar codes are two-dimensional and are capable of "storing" or containing or representing more information than typical linear bar codes in a given area. The QR ("Quick Response") code is a type of matrix symbology designed in the early 1990s by Denso Wave Inc. of Japan ("Denso") that became widely adopted for product tracking and identification. QR codes are symbols typically defined in a square area having an arrangement of smaller black squares that form a pattern on a white background. The QR code square is read by an imaging device, e.g., a camera on a smart phone or tablet. The image is processed to extract information, e.g., mobile links to webpages, contained or embedded or represented by the pattern of black squares using known symbology rules. Once extracted, text may be displayed on the device that captures the image and/or may use a URL contained in the code to direct the device to an intended webpage. Users at retail stores may scan QR codes affixed to products to have product-associated information displayed on their phone, tablet or other mobile device.

In connection with the key cutting services of the present invention, the QR-code service involves: identifying key products (e.g., master key); capturing master key image data; ordering duplicate key products; generating transaction data and related QR code; and facilitating payment transaction in connection with off-site key cutting services, e.g., the systems shown and described related to FIGS. 8A/8B. In one manner of operation, the QR-code service replaces or obviates the need for a credit card reader or other point-of-sale (POS) system and related fees. The QR-code service may be generated by the ROKs Box system described above to use imaging function to scan a code and create, initiate, or identify a transaction associated with a QR code, including assigning a new QR code to a transaction related to the key duplication process. The system may navigate the user to a cart to check out and pay for the key duplicating service and duplicate key. Users capture an image of the QR code using standard imaging techniques as included on smart phones or tablets ("QR Enabled Device"). The QR Enabled Device decodes the captured QR code and extracts link information and/or other product related information for display on the device or for establishing a link via URL to a webpage, e.g., for checking out and processing payment. Once the QR Enabled Device links to the key cutting service-managed webpage or mobile app page view, the user may proceed with viewing additional information related to the product associated with the QR code and may proceed with purchasing the product/service presented via the webpage or mobile app page view. At a central key cutting facility, the service prepares a transaction screen to process payment or other ordering of the product/service and may deliver same to the user/customer, e.g., on mobile device. In one alternative, the central key cutting facility may be a central server at one location and a key cutting machine at the same or a different location. The transaction may then proceed to a traditional credit card processing function or other form of payment, e.g., PayPal, Venmo, etc. In addition, the QR code generated or previously assigned to the transaction may be stored in a data base for future use, such as with the Key-By-Mail system described herein and/or by reference.

More particularly, the systems described above include systems that provide on-site key duplication selection and ordering, e.g., at an auto parts store or big box store, for off-site key cutting services, e.g., at a central service or distributed key cutting facility. For example, the key cutting service may include a network of remote user-operated kiosks or counter-top machines located at retail premises. The remote machines are connected over a communications network, e.g., Internet, to the central service. Each remote unit is tablet-based having camera/imaging features and including a user interface, e.g., ROKS (Retail Optical Key Scanning) Box. The remote ROKS Box machine presents prompts to a user via a display, receives user inputs to those prompts (e.g., make, model, year (MMY) of a target vehicle associated with a master key for duplicating) via user interface elements, presents the user with key blank identifying and selecting interfaces, and captures images of a master key for duplication. The ROKs Box may include image capturing capabilities and/or may be adapted to communicate with mobile devices, e.g., smart phones, tablets, etc., and receive key related images captured by image capturing (e.g., camera) features on such mobile devices.

In more detail, after a user inputs MMY information associated with a master key in the ROKS Box, the ROKS Box determines if there are matching key blank SKUs. If there are multiple matching SKUs, the machine prompts the user for additional information to narrow down the list of potential matches. The user is presented with one or more SKUs, preferably with images of the key blank to visually compare with the master key, and the user selects a matching key blank/SKU. Upon a user selecting a SKU matching the master key, the user inserts the master key key blade into a receiving portion of the ROKS Box, a camera or imaging device takes a photo or otherwise captures an image of the master key key blade. Alternatively, the customer may be prompted to insert the master key early in the process to help identify a matching duplicate key SKU.

The system may confirm the captured image is clear and otherwise suitable for cutting a duplicate key at the central key cutting facility. If it determines the captured image is not suitable then it will prompt the user to reposition the key and retake the photo or take a photo from a different position. This process is repeated until suitable images are captured. Once the machine has captured suitable image data for duplication, the user then adds the SKU to an electronic cart optionally along with a compatible dongle SKU if needed for programming/pairing the duplicate key with the target vehicle. The user may repeat this process for other SKUs if desired. During this process, the ROKS Box can optionally require that an authorized associate login to the ROKS Box to confirm integrity of the selection and user inputs prior to placing an order and committing the transaction.

As discussed in more detail below, the information collected at the ROKS Box is communicated to the central server and key cutting service where a duplicate key is cut. The key duplicate is either sent to the local retail store for pick up by the customer at a later date or is sent directly to the customer along with any necessary pairing or programming devices and instructions.

With respect to the associated QR Code Generation and Use in connection with key cutting services, QR codes are generated (encoded) and processed (decoded) in connection with the service. Specifically, after a customer initiates a master key duplication session at the ROKS Box or by use of a smartphone or other remote access device, the customer enters master key identifying information, captures images of the master key for duplication, and selects a key blank product. A QR code is generated and associated with the session or transaction for further processing. A unique transaction ID is assigned to the session or transaction and that unique code is embedded in the generated QR code along with a URL or other link associated with the central service. The central service utilizes database structures to associate the transaction ID with the QR code and master key image data captured by and uploaded from the ROKS Box or Smartphone or other remote access device.

Other than the assigned unique identifier, the QR code may or may not include financial transaction data. In addition to the URL and transaction ID, other data may be embedded in the QR code related to the transaction, e.g., the Serial Number or other identifier of the ROKS Box; the store ID or identifier confirming the retailer and location where the ROKS Box is situated; the associate ID number of the employee logged in and helping the customer, if any, key product information, and/or customer information. In one manner, the additional data is stored at the central server with the associations made via a database and transaction record and other records, e.g., retailer and/or store record.

The QR code may be displayed at the ROKS Box and/or the mobile device used to capture master key image data. At this point there are two exemplary paths for use of the QR code and completion of an order and purchase: PATH 1—internal store use of the QR code to identify SKU numbers or the like; and PATH 2—direct customer use of the QR code with the central service.

PATH 1—An order transaction and payment are processed locally with assistance of a store attendant, who may use a local store bar code associated with a duplicate key SKU or may use the generated QR code to access key product information. A retail sales associate can submit the order to CKE and scan in the QR code(s) and/or bar code(s) to allow the customer to check out using the retail store's local POS system. As the ROKS Box and associated QR codes generated by it may not be integrated into the retailer POS, a separate bar code associated with the selected SKU may be used to enter a transaction via the on-site POS. In this situation, the bar code would not lend itself to retrieving the transaction information, but instead simply allow pulling up the price for the SKU(s) from the store's own POS system. The QR code, however, can act as either a bar code or a method of retrieval of the transaction data via the Internet by a store employee. The captured image data, store ID, and transaction ID and QR code are communicated to a central service key cutting facility, where a duplicate key is cut and returned to the local store along with programming dongle and/or instructions. The customer may later return to the store to obtain the duplicate key and pair the duplicate key with the target vehicle.

PATH 2—As an alternative to processing the transaction via the retailer POS, the user may be directly prompted at the ROKS Box to scan the QR code with their mobile device, e.g., smart phone. The QR code generated by the CKE SERVICE and displayed at the ROKS Box includes a URL link. Upon scanning the QR code displayed on the ROKS Box, the mobile device is directed, by the embedded URL link in the QR code, to a webpage generated by the central server to process the transaction directly, e.g., a CKE checkout page where credit cards and other forms of payment are allowed. In this path the user may complete a transaction to purchase the duplicate key directly from the central service. In this manner, the ROKS Box based customer interaction may be conducted without the need for a credit card or other payment process present on the ROKS Box and without the need for any or further store involvement. The webpage presented via the QR code URL link may be configured to appear as branded or coming from or associated with the local store, e.g., Auto Zone, at which the ROKS Box is located or it may have branding indicia associated with the central service, e.g., Car Keys Express (CKE). In addition, other services or events may occur, e.g., the user optionally creates an account with CKE, and the user optionally opts in or opts out of saving their key to the CKE Key Vault. Once the transaction is completed via the central service, and as described above, the central service processes the captured master key image data received from the ROKS Box to cut a duplicate key. Using the store ID and transaction ID, the central service key cutting facility forwards the duplicate key to the local store associated with the store ID or directly to the customer along with programming dongle and/or instructions if needed for pairing the key to the target vehicle.

For ease of reference, the reference below to "Path 1" and/or "Path 2" may be used to distinguish the exemplary respective transaction processing paths provided in connection with the key cutting services disclosed herein.

After the transaction is completed, the central key cutting service retrieves the identified and selected key blank SKU product, processes the master key image data to determine a set of key bitting data for cutting a duplicate key blade, and cuts the duplicate key. For example, the central key cutting services or facility may use the image-based processes, e.g., correlation, re-positioning, rotation, line detection, feature extraction, discussed above to cut a duplicate key. If the transaction was completed at the store via store POS, the central service will be able to track payment or credit received from the retailer related to the order. Using the store ID data, the duplicate key may be forwarded to the retail store along with any necessary dongle or other pairing device. Alternatively, if the user/customer made the purchase directly, then the central service may forward the key directly to the customer or to the retail store along with any necessary dongle or other pairing device. If the transaction was completed at the central service, then a retailer credit and/or salesperson commission may be computed associated with the customer order initiation at the ROKS Box using the store ID and associate ID data. In this manner the service can easily track order/transaction events and proper accounting for the orders. To the extent additional "back office" accounting processes occurs this is outside the context and use of the QR code as generated and used in the ROKS Box key cutting service.

In addition, the key cutting service may include traditional delivery services and/or drone-based delivery. For example a central key cutting facility may be distributed across geographic areas to provide drone-based delivery directly or via a fleet of vehicles having drone delivery capabilities to deliver duplicate keys cut according to the processes described herein. In one manner of operation, the key cutting service cuts keys and sends a drone from a van or other drone nesting location to a customer within a predetermined range of the van or other nesting location. The drone delivers the duplicate key and returns to the van or other nesting location. In one key aspect of this delivery service, a customer stranded and unable to operate their vehicle may order a duplicate key, capture master key image data or engage a key bank repository of stored master key data (e.g., known master key bitting information and/or other encoded or encrypted key information—such as keyless entry information), the central or distributed key cutting service generates a duplicate key and delivers a duplicate key based on the user order entered via a mobile device directly to the user via the van-based or nesting location-based drone delivery service. In this example, customer delivery location may be based on GPS provided information. For example, a stranded customer may not know or may not have available a street address on which to base delivery. GPS information may be used in lieu of street address location.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A system for creating a duplicate of a master key based on an image of the master key keyblade captured at a remote access device, the system configured to:
   present, at the remote access device, a user interface;
   receive via the user interface, a user input data identifying a master key to be duplicated based on vehicle or master key identifying information;
   capture, by an imaging device associated with the remote access device, master key image data;
   communicate, via a communications network, the captured master key image data and user input data to a central server in communication with a key cutting machine and being at a location other than the remote access device, the captured master key image data including at least one image of the master key;
   extract, by the central server, key code information from the master key image data for use in cutting a duplicate key, the extraction including one or more feature extraction and correlation techniques using a key template, wherein one or more of the feature extraction and correlation techniques comprises:
   calculating, based at least in part on the feature extraction, a physical template of a keyblade of the master key;
   extracting a series of depth measurements related to cuts detected on the keyblade of the master key;
   temporarily storing, in memory, the extracted series of depth measurements and the physical template;
   calculating a first error factor associated with the temporarily stored extracted series of depth measurements;
   repositioning the master key image;
   calculating a second error factor associated with another series of depth measurements extracted based on the repositioned master key image; and
   determining which of the first error factor and the second error factor has the least error; and
   cut, at the key cutting machine, a duplicate of the master key using the extracted key code information.

2. The system of claim 1, wherein repositioning the master key is performed by use of correlation using the key template.

3. The system of claim 1, wherein the feature extraction includes determining at least one of a keyblade base and a keyblade tip and determining one or more measurements associated with at least one of the keyblade base and keyblade tip.

4. The system of claim 1, wherein the feature extraction includes performing an automatic rotation of the master key image using a line identification process.

5. The system of claim 1, wherein the feature extraction includes measuring a distance between two identified master key features.

6. The system of claim 1, wherein the first or second error factor is calculated based on a distance from a detected edge of the keyblade to an ideal edge of the physical template.

7. The system of claim 1, wherein the system is configured to present the user with a hierarchical sequence of prompts based on a decision tree and a set of received user inputs in response to the sequence of prompts.

8. The system of claim 1, wherein the system is configured to iteratively perform bitting determination and validation with evaluation and adjustment of subsequent bitting outputs of each pass to arrive at a final bitting output, the iteratively performing involving referencing known validation data against each pass of the iterative bitting determination algorithm and updating a confidence value at each bit position.

9. The system of claim 1, wherein repositioning the master key image includes one or both of rotating the image and sliding the image.

10. The system of claim 1, wherein the system is further configured to adjust template scale to minimize error in depth of cuts.

11. The system of claim 1, wherein the system is further configured to generate a key order record and generate a QR code or other reference related to the key cutting order, wherein the key order record comprises the master key image data, the user input data and the QR code or other reference.

12. The system of claim 11 wherein the system is further configured to extract, by use of a mobile device, product related information from the QR code, the product related information including links to mobile app pages, URLs or webpages.

13. The system of claim 1, wherein the system is further configured to consult a set of stored master key code data to determine if the extracted key code data is valid.

14. The system of claim 1, wherein the system is further configured to consult a set of stored master key code data to determine if the extracted key code data is valid and, if determined valid then using a stored set of valid key code bitting pattern information to determine a bitting pattern for use in creating the duplicate key.

15. The system of claim 1, wherein the system is further configured to deliver a duplicate key via a drone service directly to a customer location or to an affiliated retail location based on user input, GPS data or stored location data.

16. A method implemented using one or more processors, comprising:
   causing to be presented, at a remote access device via a communications network, a user interface;
   receiving, from the remote access device via the user interface, a user input data identifying a master key to be duplicated based on vehicle or master key identifying information;
   receiving master key image data captured by an imaging device associated with the remote access device;
   extracting key code information from the master key image data for use in cutting a duplicate key, the extracting including one or more feature extraction and correlation techniques using a key template, wherein one or more of the feature extraction and correlation techniques comprises:
   calculating, based at least in part on the feature extraction, a physical template of a keyblade of the master key;
   extracting a series of depth measurements related to cuts detected on the keyblade of the master key;
   temporarily storing, in memory, the extracted series of depth measurements and the physical template;
   calculating a first error factor associated with the temporarily stored extracted series of depth measurements;
   repositioning the master key image;
   calculating a second error factor associated with another series of depth measurements extracted based on the repositioned master key image; and
   determining which of the first error factor and the second error factor has the least error; and
   causing a duplicate of the master key to be cut at a cutting machine using the extracted key code information.

17. The method of claim 16, wherein the feature extraction includes determining at least one of a keyblade base and a keyblade tip and determining one or more measurements associated with at least one of the keyblade base and keyblade tip.

18. The method of claim 16, wherein the feature extraction includes performing an automatic rotation of the master key image using a line identification process.

19. The method of claim 16, wherein the feature extraction includes measuring a distance between two identified master key features.

20. The method of claim 16, wherein the first or second error factor is calculated based on a distance from a detected edge of the keyblade to an ideal edge of the physical template.

21. The method of claim 16, comprising presenting the user with a hierarchical sequence of prompts based on a decision tree and a set of received user inputs in response to the sequence of prompts.

22. The method of claim 16, wherein extracting key code information from the master key image data includes iteratively performing bitting determination and validation with evaluation and adjustment of subsequent bitting outputs of each pass to arrive at a final bitting output, the iteratively performing involving referencing known validation data against each pass of the iterative bitting determination and updating a confidence value at each bit position.

23. The method of claim 16, wherein repositioning the master key image includes one or both of rotating the image and sliding the image.

24. The method of claim 16, further comprising adjusting template scale to minimize error in depth of cuts.

25. The method of claim 16, further comprising generating a key order record and generating a QR code or other reference related to the key cutting order, wherein the key order record comprises the master key image data, the user input data and the QR code or other reference.

26. The method of claim 25 further comprising extracting, by use of a mobile device, product related information from the QR code, the product related information including links to mobile app pages, URLs or webpages.

27. The method of claim 16, further comprising consulting a set of stored master key code data to determine if the extracted key code data is valid.

28. The method of claim 16, further comprising consulting a set of stored master key code data to determine if the extracted key code data is valid and, if determined valid then using a stored set of valid key code bitting pattern information to determine a bitting pattern for use in creating the duplicate key.

29. The method of claim 16, further comprising causing a duplicate key to be delivered via a drone service directly to a customer location or to an affiliated retail location based on user input, GPS data or stored location data.

* * * * *